(12) United States Patent
Miyamoto

(10) Patent No.: US 6,546,500 B1
(45) Date of Patent: Apr. 8, 2003

(54) COMPUTER, COMPUTER NETWORK SYSTEM, AND RECORDING MEDIUM

(75) Inventor: Takashi Miyamoto, Tokushima (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/490,069

(22) Filed: Jan. 24, 2000

(30) Foreign Application Priority Data

Mar. 19, 1999 (JP) .......................... 11-076777
Apr. 12, 1999 (JP) .......................... 11-104594

(51) Int. Cl.⁷ .............................. G06F 11/00
(52) U.S. Cl. .................... 714/6; 714/6; 714/5
(58) Field of Search .................. 711/162; 707/202, 707/204; 714/25, 37, 32, 42, 16, 5, 36, 20, 15, 6

(56) References Cited

U.S. PATENT DOCUMENTS

| | | | |
|---|---|---|---|
| 5,704,031 A | | 12/1997 | Mikami et al. |
| 5,812,565 A | * | 9/1998 | Fendt et al. ............ 714/6 |
| 5,930,824 A | * | 7/1999 | Anglin et al. ............ 345/418 |
| 5,958,062 A | | 9/1999 | Komasaka et al. |
| 5,991,772 A | * | 11/1999 | Doherty et al. ............ 707/1 |
| 6,065,017 A | * | 5/2000 | Barker ............ 707/202 |
| 6,192,484 B1 | * | 2/2001 | Asano ............ 711/114 |
| 6,212,652 B1 | * | 4/2001 | Williams ............ 714/25 |
| 6,279,011 B1 | * | 8/2001 | Muhlestein ............ 707/204 |
| 6,397,309 B2 | * | 5/2002 | Kedem et al. ............ 711/162 |
| 6,424,999 B1 | * | 7/2002 | Arnon et al. ............ 709/208 |

FOREIGN PATENT DOCUMENTS

| | | | | |
|---|---|---|---|---|
| JP | 030 048 948 A | 3/1991 | ........ | G06F/12/00 |
| JP | 050 073 388 A | 3/1993 | ........ | G06F/12/00 |
| JP | 060 083 685 A | 3/1994 | ........ | G06F/12/00 |
| JP | 070 306 802 A | 11/1995 | ........ | G06F/12/00 |
| JP | 8-272643 | 10/1996 | | |
| JP | 100 171 693 A | 6/1998 | ........ | G06F/12/00 |
| JP | 10-260859 | 9/1998 | | |
| JP | 10-260860 | 9/1998 | | |
| JP | 11-265300 | 9/1999 | | |
| JP | 11-265301 | 9/1999 | | |

* cited by examiner

*Primary Examiner*—Robert Beausoliel
*Assistant Examiner*—Marc M Duncan
(74) *Attorney, Agent, or Firm*—Staas & Halsey LLP

(57) ABSTRACT

According to the present invention, it is possible to identify such data that need not undergo the subsequent diagnosis-and-recovery operations based on results of self-diagnosis performed up to the current performing of diagnosis, each time diagnosis is performed as many as the predetermined number of times or each time a predetermined lapse of time passes or a user makes an instruction to that effect. Also, each time diagnosis is performed as many as the predetermined umber of times or each time a predetermined lapse of time passes or each time the user makes an instruction to that effect, based on results of self-diagnosis performed up to the current performing of diagnosis, backup data of interest is classified into frequently-used backup data and not-immediately-required backup data automatically, which are then backed up in mutually different storage media. Also, the frequently-used backup data is stored in a storage medium having a relatively high read-out speed and the not-immediately-required backup data, in a storage medium having a relatively low read-out speed. Also, the not-immediately-required data is compressed before being backed up in the storage medium.

22 Claims, 25 Drawing Sheets

| FOLDER NAME | DIAGNOSIS/ RECOVERY OBJECT |
|---|---|
| FOLDER A | 1 |
| FOLDER B | 1 |
| FOLDER C | 1 |
| FOLDER D | 0 |
| FOLDER E | 1 |
| FOLDER F | 0 |
| | |

FIG. 4

| FILE | NECESSITY OF RECOVERY |
|---|---|
| FILE A1 | 1 |
| FILE A2 | 0 |
| | |
| FILE Ai | 0 |
| FILE B1 | 1 |
| FILE B2 | 1 |
| FILE B3 | 1 |
| | |

| FOLDER | FILE | RECOVERY TIMES | RECOVERY FREQUENCY (%) |
|---|---|---|---|
| FOLDER A | FILE A1 | 51 | 85 |
| | FILE A2 | 20 | 33 |
| | ⋮ | | |
| | FILE Ai | 0 | 0 |
| FOLDER B | FILE B1 | 60 | 100 |
| | FILE B2 | 60 | 100 |
| | FILE B3 | 60 | 100 |
| | ⋮ | | |

| FOLDER NAME | BACKUP REGION |
|---|---|
| FOLDER A | 1 |
| FOLDER B | 1 |
| FOLDER C | 1 |
| FOLDER D | 0 |
| FOLDER E | 1 |
| FOLDER F | 0 |

34

$\begin{pmatrix} \text{1:BACKUP FILE} \\ \text{0:AUXILIARY STORAGE} \\ \text{MEDIUM} \end{pmatrix}$

FIG. 14

| FILE | NECESSITY OF RECOVERY |
|---|---|
| FILE A1 | 1 |
| FILE A2 | 0 |
| | |
| FILE Ai | 0 |
| FILE B1 | 1 |
| FILE B2 | 1 |
| FILE B3 | 1 |
| | |

| FOLDER | FILE | RECOVERY TIMES | RECOVERY FREQUENCY (%) |
|---|---|---|---|
| FOLDER A | FILE A1 | 51 | 85 |
| | FILE A2 | 20 | 33 |
| | ⋮ | | |
| | FILE Ai | 0 | 0 |
| FOLDER B | FILE B1 | 60 | 100 |
| | FILE B2 | 60 | 100 |
| | FILE B3 | 60 | 100 |
| | ⋮ | | |

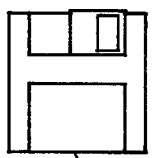
205M

PC11: TO STORE INFORMATION TO SPECIFY RECOVERED DATA IN DIAGNOSIS-AND-RECOVERY-RESULT LOG FILE 28 EVERY TIME SELF-DIAGNOSIS IS PERFORMED

PC12: TO CLASSIFY CONTENTS OF DIAGNOSIS-AND-RECOVERY-RESULT LOG FILE 28 INTO INFORMATION TO SPECIFY EACH DATA PIECE AND SUM UP CLASSIFIED INFORMATION, EVERY TIME SELF-DIAGNOSIS IS PERFORMED

PC13: TO STORE DIAGNOSIS-AND-RECOVERY-RESULT LOG SUMMING-UP FILE 29 WHICH SUMS UP DIAGNOSIS-AND-RECOVERY-RESULT LOG FILE 28

PC14: TO ANALYZE DIAGNOSIS-AND-RECOVERY-RESULT LOG SUMMING-UP FILE 29 BASED ON ANALYSIS-CONDITION FILE 30 IN ORDER TO DETERMINE WHETHER EACH DATA PIECE SHOULD BE SUBJECT TO DIAGNOSIS AND RECOVERY

PC15: TO CHANGE SETTINGS OF DIAGNOSIS-AND-RECOVERY-REGION SETTING FILE 25 ACCORDING TO ANALYSIS RESULT OF CLASSIFIED RESULT OF DIAGNOSIS-AND-RECOVERY-RESULT LOG SUMMING-UP FILE 29

FIG. 24

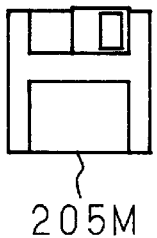

| | |
|---|---|
| PC21: | TO CLASSIFY CONTENTS OF DIAGNOSIS-AND-RECOVERY-RESULT LOG FILE 28 INTO INFORMATION WHICH SPECIFIES EACH DATA PIECE AND SUM UP CLASSIFIED INFORMATION, EVERY TIME CLIENT COMPUTER 200 PERFORMS SELF-DIAGNOSIS |
| PC22: | TO STORE DIAGNOSIS-AND-RECOVERY-RESULT LOG SUMMING-UP FILE 29 WHICH SUMS UP DIAGNOSIS-AND-RECOVERY-RESULT LOG FILE 28 FOR EACH CLIENT COMPUTER 200 |
| PC23: | TO ANALYZE DIAGNOSIS-AND-RECOVERY-RESULT LOG FILE 29 BASED ON ANALYSIS-CONDITION FILE 30 TO DETERMINE WHETHER EACH DATA PIECE SHOULD BE SUBJECT TO DIAGNOSIS AND RECOVERY FOR EACH CLIENT COMPUTER 200 |
| PC24 | TO CHANGE SETTINGS OF DIAGNOSIS-AND-RECOVERY-REGION SETTING FILE 25 OF CLIENT COMPUTER 200 ACCORDING TO ANALYSIS RESULT OF DIAGNOSIS-AND-RECOVERY-RESULT LOG SUMMING-UP FILE 29 |

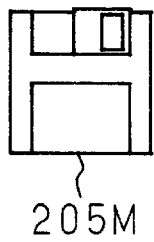

| |
|---|
| PC11: TO STORE INFORMATION TO SPECIFY RECOVERED DATA IN DIAGNOSIS-AND-RECOVERY-RESULT LOG FILE 28 EVERY TIME SELF-DIAGNOSIS IS PERFORMED |
| PC12: TO CLASSIFY INFORMATION STORED IN DIAGNOSIS-AND-RECOVERY-RESULT LOG FILE 28 AND SUM UP CLASSIFIED INFORMATION, EVERY TIME SELF-DIAGNOSIS IS PERFORMED |
| PC13: TO STORE SUMMING-UP RESULT IN DIAGNOSIS-AND-RECOVERY-RESULT LOG SUMMING-UP FILE 29(or 13) |
| PC14: TO ANALYZE SUMMING-UP RESULT STORED IN DIAGNOSIS-AND-RECOVERY-RESULT LOG SUMMING-UP FILE 29(or 13) ACCORDING TO ANALYSIS CONDITION STORED IN ANALYSIS-CONDITION FILE 30(or 14) IN ORDER TO DETERMINE WHETHER BACKUP DATA SHOULD BE STORED IN BACKUP FILE 23 OR IN AUXILIARY STORAGE MEDIUM 40 |
| PC15: TO CHANGE BACKUP REGION OF BACKUP DATA FROM BACKUP FILE 23 TO AUXILIARY STORAGE MEDIUM 40 ACCORDING TO ANALYSIS RESULT |
| PC16: TO COMPRESS DATA WHEN CHANGING BACKUP REGION OF BACKUP DATA FROM BACKUP FILE 23 TO AUXILIARY STORAGE MEDIUM 40 |

205M

COMPUTER, COMPUTER NETWORK SYSTEM, AND RECORDING MEDIUM

BACKGROUND OF THE INVENTION

The present invention relates to a computer to automatically set a region which needs recovery based on self-diagnosis results obtained in self-maintenance and a region which need not undergo such recovery, and a recording medium which records therein a computer program which provides a general-purpose computer with such function.

The present invention relates also to a computer to automatically set backup region for storing backup data required in self-maintenance when storing the backup date in either a backup region in, for example, a hard disk device for storing backup data having a high use frequency so as to read the data out quickly or a backup region in, for example, an external auxiliary storage for storing, for example, as compressed, backup data having a low use frequency, and a recording medium which records therein such a computer program that provides a general-purpose computer with such function.

The present invention relates also to a computer network system such as a client/server system which realizes the above-mentioned function by a plurality of computers interconnected over a computer network to a computer connected to such a computer network system, and also to a recording medium which records therein a computer program which enables a general-purpose computer to function as such a computer.

A self-maintenance system for a computer beforehand saves a copy of data (application files, data files, etc.) in a backup region as backup data, so that if, for example, some data is found to have been damaged or is infected with a computer virus based on results of self-diagnosis, some data may be rewritten with the data saved in the backup region so as to immediately recover the data.

There has been, on the other hand, prevailing such a computer network system as a client/server system with a plurality of computers interconnected over a network, accompanied by improvements in performance of personal computers. In a client/server system, a mistake in user's operations or simple mistake in configuration may trigger a trouble which influences the whole network system, wherein maintenance work itself becomes impossible and the system down may occur until the trouble is eliminated. Such a possibility increases as the number of computers connected to the network increases, so that the larger the network system is, the larger the economical loss becomes. Therefore, self-maintenance is more important in such a network system as a client/server system than in a stand-alone computer, which is used independently.

Further, in such a system as a client/server system which uses a plurality of computers as clients and servers, an important issue in recent years is an infection with a computer virus. That is, if a computer virus invade a computer of one of a plurality of clients in a client/server system, all the clients and the servers are infected over the network, thus causing a serious loss. To guard against this, it is very important to carry out system maintenance effectively in order to operate the client/server system appropriately. This is basically true also with a standalone computer.

With such a situation given as a background, not only for respective computers of a client/server system but also for a stand-alone computer backup work as part of maintenance is undergone, more specifically a copy of data (application files, data files, etc.) used by each computer is saved as backup data. By thus saving such backup data and performing self-maintenance, it is possible to immediately recover data in each computer if the data is damaged or the computer is infected with a virus.

In self-maintenance for a stand-alone computer of a conventional type or each computer connected to such a computer network system as a client/server system, time required for the self-maintenance is reduced by specifying beforehand data which need not be recovered so as to be handled as something not subject to the self-maintenance. Conventionally, however, data not subject to self-maintenance has been set manually, so that although, for example, a user-created working file, a temp folder, etc., which can be easily recognized as something not subject to self-maintenance can be set to that effect, the other data needs sophisticated knowledge and know-how to set as something not subject to self-maintenance.

Besides, each computer recently has an increasingly large scale of the OS or the client OS or file size of application software as well as increasingly complicated contents, thus requiring longer time for self-maintenance, and not only an ordinary user but even a system manager can hardly determine whether a region should be subject to self-maintenance or not. Therefore, load on working increases and also whole required working time becomes longer, thereby to lower availability of a stand-alone computer and of network system such as a client/server system.

Furthermore, recently each computer has an increasingly large scale of the OS or the client OS or file size of application software as well as increasingly complicated contents, thus requiring an even larger capacity of backup regions than the conventional one. With this, there are some cases where each computer requires a few hundreds of mega-bytes or even one giga-byte or more as a capacity of the backup region. Furthermore, such a computer network system as a client/server system may require a vast capacity of memory to set all of backup regions of a plurality of client computers in a server computer, which may be difficult to secure sometimes.

BRIEF SUMMARY OF THE INVENTION

In view of the above, it is an object of the present invention to provide a stand-alone computer, a computer network system such as a client/server system interconnecting a plurality of computers over a network, and a computer used in such a system capable of, in self-maintenance, setting regions subject to self-maintenance and those not subject to self-maintenance without a need of specifying a region clearly known not to be subject to self-maintenance, or investigating the OS and application software, or reviewing settings by referring to information stored by an individual. It is another object of the present invention to provide a recording medium for recording a computer program which enables a general-purpose computer to realize such a computer.

It is further another object of the present invention to provide a stand-alone computer, a computer network system such as a client/server system interconnecting a plurality of computers over a network, and a computer used in such a system having a reduced backup data storage capacity by backing up frequently-used backup data and not-immediately-required backup data in different storage media. It is further another object of the present invention to provide a storage medium which stores therein a computer program that enables a general-purpose computer to realize such a computer.

In short, a stand-alone computer or a computer connected to such a computer network system as a client/server system according to the present invention comprises: means for summing up recovery-result logs accompanied by self-diagnosis results for each data piece; an analysis-condition file for setting conditions for analysis; means for analyzing whether the results obtained by summing up the recovery-result logs for each data piece satisfy the conditions; and means for setting, when the results satisfy the conditions, a file of interest as a one not subject to subsequent recovery.

Also, in short, a stand-alone computer or a computer connected to a computer network system such as a client/server system according to the present invention automatically classifies frequently-used backup data and not-immediately-required backup data to back up the frequently-used backup data in a storage medium of a relatively high read out speed, and to back up the not-immediately-required backup data, even as compressed, in a storage medium of a relatively low read out speed.

A computer according to the present invention comprises: a backup-data storage unit for storing backup data of data usable by the computer itself; a diagnosis-and-recovery object settings storage unit where information to specify data to be subject to diagnosis and recovery among the data usable by the computer itself is set a diagnosis-and-recovery unit for replacing with the data saved in the backup-data storage unit such data specified by the information set in the diagnosis-and-recovery-object settings storage unit, among the data diagnosed to need recovery based on results of self-diagnosis on data usable by the computer itself, thus recovering the data; a diagnosis-and-recovery result storage unit for storing information which specifies recovered data each time the diagnosis-and-recovery means performs self-diagnosis; a diagnosis-and-recovery result summing-up unit for classifying storage contents of the diagnosis-and-recovery result storage unit into information which specifies each data piece and seem up the classified information, each time the diagnosis-and-recovery unit performs self-diagnosis; a diagnosis-recovery-result summing-up storage unit for storing results of summing up by the diagnosis-and-recovery result summing-up unit; an analysis-condition storage unit for storing conditions for analyzing the storage contents of the diagnosis-and-recovery result summing-up storage unit; a diagnosis-and-recovery-result analysis unit for analyzing the storage contents of the diagnosis-and-recovery-result summing-up storage unit according to the storage contents of the analysis-condition storage unit, to decide whether each data piece should be subject to diagnosis and recovery; and a new-diagnosis-and-recovery-object setting unit for changing settings of the diagnosis-and-recovery-object settings storage unit according to the results of analysis by the diagnosis-and-recovery results analysis unit.

Also, in the above-mentioned computer according to the present invention, the conditions stored in the analysis-condition storage unit include a frequency and the number of times of performing recovery for each data piece.

In such a computer according to the present invention as mentioned above, each time diagnosis is performed as many as the predetermined number of times each time the predetermined length of time passes, or each time user issues as instruction, data not to need subsequent diagnosis and recovery is known based on the results of the hitherto performed self-diagnosis, so that as for only such data that needs diagnosis and recovery, diagnosis and recovery is undergone when the subsequent diagnosis is to be performed.

Also, a computer network system according to the present invention comes in such a system in which a first computer and a second computer which stores backup data of the data usable by the first computer are connected to a network, one of computers connected to the network comprises: a diagnosis-and-recovery-object settings storage unit where information to specify data to be subject to diagnosis and recovery, among the data usable by the first computer; a diagnosis-and-recovery unit for replacing with data saved in the second computer such data specified by the information set in the diagnosis-and-recovery-object settings storage unit among data diagnosed to need recovery based on results of diagnosing data usable by the first computer, thus recovering the data; a diagnosis-and-recovery-result storage unit for storing information which specifies recovered data each time the diagnosis-and-recovery unit diagnoses the first computer; a diagnosis-and-recovery-result collecting/summing-up unit for collecting the storage contents of the diagnosis-and-recovery-result storage unit and classifying the collected contents into information which specifies each data piece and summing the classified data up each time the diagnosis-and-recovery unit diagnoses the first computer; a diagnosis-and-recovery-result summing-up storage unit for storing results of summing up by the diagnosis-and-recovery-result collecting/summing-up unit; an analysis-condition storage unit for storing conditions for analyzing the storage contents of the diagnosis-and-recovery-result summing-up storage unit; a diagnosis-and-recovery-result analysis unit for analyzing the storage contents of the diagnosis-and-recovery-result summing-up storage unit according to the storage contents of the analysis-condition storage unit, to decide whether each data piece should be subject to diagnosis and recovery; and a diagnosis-and-recovery-object settings changing unit for changing settings of the diagnosis-and-recovery-object settings storage unit according to the results of analyzing by the diagnosis-and-recovery-result analysis unit.

In such a computer network system according to the present invention as mentioned above, the conditions stored in the analysis-condition storage unit include a frequency and the number of times of recovering each data piece concerning the first computer.

In such a computer network system according to the present invention, in every first computer, each time diagnosis is performed as many as the predetermined number of times, each time the predetermined length of time passes, or each time a user issues an instructions, data not to need subsequent diagnosis and recovery is known based on the results of the hitherto self-diagnosis performed by the every first computer, so that as for only such data that needs diagnosis and recovery, diagnosis and recovery is undergone when the subsequent diagnosis is to be performed.

Also, the computer network system according to the present invention which is connected via a network to such a computer that comprises: a diagnosis-and-recovery-object settings storage unit for setting information which specifies data to be subject to diagnosis and recovery among the data usable by a computer subject to diagnosis; a diagnosis-and-recovery unit for replacing with backup data such data specified by the information set in the diagnosis-and-recovery-object settings storage unit, among the data diagnosed to need recovery based on results of diagnosing the data usable by the computer subject to diagnosis, thus recovering the data; a diagnosis-and-recovery-result storage unit for storing information which specifies recovered data each time the diagnosis-and-recovery unit performs diagnosis; a diagnosis-and-recovery-result collecting/summing-up unit for collecting the storage contents of the diagnosis-and-recovery-result storage unit to classify the collected contents into information which specifies each data piece and sum the classified information up each time the diagnosis-and-recovery unit diagnoses the computer subject to diagnosis and recovery; a diagnosis-and-recovery-result summing-up storage unit for storing results of summing up by the diagnosis-and-recovery-result collecting/summing-up unit; an analysis-condition storage unit for storing conditions for analyzing the storage contents of the diagnosis-and-recovery-result summing-up storage unit; a diagnosis-and-recovery-result analysis unit for analyzing the storage contents of the diagnosis-and-recovery-result summing-up storage unit according to the storage contents of the analysis-condition storage unit and deciding whether each data piece should be subject to diagnosis and recovery; and a diagnosis-and-recovery-object settings changing unit for changing settings of the diagnosis-and-recovery-object settings storage unit according to the results of analysis by the diagnosis-and-recovery-result analysis unit.

Also, in the above-mentioned computer according to the present invention, the conditions stored in the analysis-condition storage unit include a frequency and the number of times of recovering each data piece relating to the computer subject to diagnosis.

By such a computer according to the present invention, data which need not undergo subsequent diagnosis-and-recovery is known based on results of self-diagnosis obtained by the diagnosis operations performed hitherto by each computer subject to diagnosis, each time the computer subject to diagnosis undergoes diagnosis as many as the predetermined number of times, or each time a predetermined lapse of time has passed, or each time a user issues an instruction to do so, so that only the data which needs diagnosis and recovery in the subsequent diagnosis undergoes diagnosis and recovery.

Also, a computer-readable recording medium according to the present invention records a computer program which causes a computer to beforehand store diagnosis-and-recovery-object setting information which is information to specify data to be subject to diagnosis and recovery among data usable by the computer, to replace with backup data such data specified by the information set as the diagnosis-and-recovery-object setting information, among the data diagnosed to need recovery based on results of self-diagnosis performed on the data usable by the computer, thus recovering the data, comprising: program code means for causing the computer to store the diagnosis-and-recovery-result information which specifies recovered data, each time self-diagnosis is performed; program code means for causing the computer to classify the contents of the diagnosis-and-recovery-result information into information which specifies each data piece and summing it up, each time self-diagnosis is performed; program code means causing the computer to store the diagnosis-and-recovery-result summing-up information obtained by summing up the diagnosis-and-recovery-result information; program code means for causing the computer to analyze the diagnosis-and-recovery-result summing-up information according to predetermined analysis-condition information to decide whether each data piece should be subject to diagnosis and recovery; and program code means for causing the computer to change settings of the diagnosis-and-recovery-object setting information according to the results obtained by analyzing the diagnosis-and-recovery-result summing-up information.

Also, in the above-mentioned configuration of the recording medium according to the present invention, the analysis-condition information includes a frequency and the number of times of recovering each data piece.

When the contents of such a recording medium according to the present invention are read into a general-purpose computer, each time diagnosis is performed as many as the predetermined number of times, or each time a predetermined lapse of time has passed, or each time a user issues an instruction to that effect, data which need not undergo subsequent diagnosis-and-recovery is known based on results of self-diagnosis performed in the hitherto diagnosis operations, so that only the data which needs diagnosis and recovery in the subsequent diagnosis undergoes diagnosis and recovery.

Also, the computer-readable recording medium according to the present invention records a computer program which program causes a computer connected to a computer subject to diagnosis to beforehand store diagnosis-and-recovery-object setting information which is information to specify data to be subject to diagnosis and recovery among data usable by the computer itself, in order to replace with backup data such data specified by the information set as the diagnosis-and-recovery-object setting information, among the data diagnosed to need recovery based on results obtained by performing self-diagnosis on the data usable by the computer itself, thus recovering the data, comprising: program code means for causing the computer to classify contents of diagnosis-and-recovery-result information of the computer subject to diagnosis into information which specifies each data piece and sum it up, each time the computer subject to diagnosis performs self-diagnosis; program code means for causing the computer to store diagnosis-and-recovery-result summing-up information obtained by summing up the diagnosis-and-recovery-result information for each diagnosis-object computer; program code means for causing the computer to analyze the diagnosis-and-recovery-result summing-up information according to predetermined analysis-condition information, to decide whether each data piece should be subject to diagnosis and recovery, for each diagnosis-object computer; and program code means for causing the computer to change settings of diagnosis-and-recovery-object setting information of the diagnosis-object computer according to the results of analyzing the diagnosis-and-recovery-result summing-up information.

In the above-mentioned configuration of the recording medium according to the present invention, the analysis-condition information includes a frequency and the number of times of recovering each data piece concerning each of the computers subject to diagnosis.

When the contents of such a recording medium are read into a computer connected to a network, each time diagnosis is performed on each of computers subject to diagnosis as many as the predetermined number of times, or each time a predetermined lapse of time has passed, or each time a user issues an instruction to that effect, only data which needs diagnosis and recovery undergoes diagnosis and recovery during diagnosis of each diagnosis-object computer, so that time required to diagnose each diagnosis-object computer is reduced.

A computer according to the present invention comprises: a diagnosis-and-recovery unit for replacing with backup data such data diagnosed to need recovery based on results of self-diagnosis performed on data usable by the computer itself, thus recovering the data; a plurality of storage media for storing backup data; a diagnosis-and-recovery-result storage unit for storing information which specifies recovered data each time the diagnosis-and-recovery unit performs self-diagnosis; a diagnosis-and-recovery-result summing-up unit for classifying the storage contents of the diagnosis-and-recovery-result storage unit into information which specifies each data piece and sum up the classified information, each time the diagnosis-and-recovery unit performs self-diagnosis; a diagnosis-and-recovery-result summing-up storage unit for storing the results obtained by summing-up by the diagnosis-and-recovery-result summing-up unit; an analysis-condition storage unit for storing conditions for analyzing the storage contents of the diagnosis-and-recovery-result summing-up storage unit; a diagnosis-and-recovery-result analysis unit for analyzing the storage contents of the diagnosis-and-recovery-result summing-up storage unit according to the storage contents of the analysis-condition storage unit, to decide into which of the plurality of storage media the backup data for each data piece should be stored; and a backup-medium changing unit for changing a storage medium for storing backup data among the plurality of storage media according to the analysis results of the diagnosis-and-recovery-result analysis unit.

More specifically, the computer according to the present invention further comprises: a plurality of storage units; and a control unit connected to the plurality of storage unit, which can performs the steps of: replacing with backup data stored in any one of the plurality of storage units the data diagnosed to need recovery based on results of self-diagnosis performed on data usable by the computer itself, thus recovering the data; storing information which specifies thus recovered data in one of the above-mentioned plurality of storage units, each time self-diagnosis is performed; classifying information which specifies the recovered data and summing it up, each time self-diagnosis is performed; storing summing-up results in one of the plurality of storage units; analyzing the summing-up results according to given conditions, to decide into which one of the plurality of storage units the backup data for each data piece should be stored; and changing a storage unit to store the backup data, among the plurality of storage units, according to the analysis results.

In the above-mentioned configuration of the computer according to the present invention, the plurality of storage media require their respective access times different from each other required for reading out data stored therein, so that the backup-medium changing unit compresses data before storing the data into a storage medium requiring a relatively long read-out time.

Also, in the above-mentioned configuration of the computer according to the present invention, the conditions stored in the analysis-condition storage unit includes a frequency and the number of times of recovering each data piece.

In such a computer according to the present invention, data is automatically classified into frequently-used backup data and not-immediately-required backup data and backed up in storage media different from each other. Specifically, the frequently-used backup data is backed up in a storage medium having a relatively fast read-out speed and the not-immediately-required backup data, into a storage medium having a relatively slow read-out speed. Further, the not-immediately-required backup data is compressed before being backed up in the storage medium.

Also, a computer network system according to the present invention have a plurality of computer connected thereto including a computer subject to diagnosis provided with a diagnosis-and-recovery unit for replacing with backup data such data diagnosed to need recovery based on results of self-diagnosis performed on data usable by computer subject to diagnosis itself, thus recovering the data, wherein at least two of the plurality of computers including the diagnosis-object computer each comprise one or more of: one or more of a plurality of storage media for storing backup data for data usable by the diagnosis-object computer; a diagnosis-and-recovery-result storage unit for storing information which specifies recovered data, each time the diagnosis-and-recovery unit performs self-diagnosis; a diagnosis-and-recovery-result summing-up unit for classifying the storage contents of the diagnosis-and-recovery-result storage unit into information which specifies each data piece and summing it up, each time the diagnosis-and-recovery unit performs self-diagnosis; a diagnosis-and-recovery-result summing-up storage unit for storing the summing-up results by the diagnosis-and-recovery-result summing-up means; an analysis-condition storage unit for storing conditions for analyzing the storage contents of the diagnosis-and-recovery-result summing-up storage unit; a diagnosis-and-recovery-result analysis unit for analyzing the storage contents of the diagnosis-and-recovery-result summing-up storage unit according to the storage contents of the analysis-condition storage unit, to decide into which one of the plurality of storage media the backup data for each data piece should be stored; and a backup-medium changing unit for changing a backup-data-storage medium to store backup data among the plurality of storage media according to the results of analysis by the diagnosis-and-recovery-result analysis unit.

More specifically, the computer network system according to the present invention has a plurality of computers connected thereto including a computer subject to diagnosis which comprises: a plurality of storage media; and a control unit capable of replacing with backup data stored in one of the plurality of storage media the data diagnosed to need recovery based on results of self-diagnosis performed on data usable by the computer itself, thus recovering the data, wherein at least two computers of the plurality of computers including the diagnosis-object computer each comprise a control unit capable of performing one or more of the steps of: storing information which specifies recovered data into one of the plurality of storage units each time the diagnosis-object computer performs self-diagnosis; classifying information which specifies recovered data and summing it up each time the diagnosis-object computer performs self-diagnosis; storing summing-up results in one of the plurality of storage units; analyzing the summing-up results according to given conditions, to decide into which one of the plurality of storage units the backup data of each data piece should be stored; and changing a storage unit into which the backup data should be stored among the plurality of storage units.

In the above-mentioned configuration of the computer network system according to the present invention, the plurality of storage units take mutually different read-out times for reading out data stored therein, so that the backup-medium changing unit compresses data before the data is stored into such a storage medium that takes a relatively long read-out time.

Also, in the above-mentioned configuration of the computer network system according to the present invention, the conditions stored in the analysis-condition storage unit include a frequency and the number of times of recovering each data piece.

In such a computer network system according to the present invention, a computer subject to recovery processing automatically classifies data into frequently-used backup data and not-immediately-required backup data and backs them up in mutually different storage media. Specifically, the frequently-used backup data is backed up in a storage medium having a relatively high read-out speed and the not-immediately-required backup data, in a storage medium having a relatively low read-out speed. Further, the not-immediately-required backup data is compressed before being backed up in the storage medium.

Also, the computer connected to the computer network system according to the present invention is connected to a diagnosis-object computer which comprises a diagnosis-and-recovery unit for replacing with backup data such data diagnosed to need recovery based on results of self-diagnosis performed on data usable by the computer subject to diagnosis itself, thus recovering the data, comprising: one or more of a plurality of storage media for storing backup data of data usable by the diagnosis-object computer; a diagnosis-and-recovery-result storage unit for storing information which specifies recovered data each time the diagnosis-and-recovery unit performs self-diagnosis; a diagnosis-and-recovery summing-up unit for classifying the storage contents of the diagnosis-and-recovery-result storage unit into information which specifies each data piece and summing it up each time the diagnosis-and-recovery unit performs self-diagnosis; a diagnosis-and-recovery-result summing-up storage unit for storing the summing-up results obtained by the diagnosis-and-recovery-result summing-up unit; an analysis-condition storage unit for storing conditions for analyzing the storage contents of the diagnosis-and-recovery-result summing-up storage unit; a diagnosis-and-recovery-result analysis unit for analyzing the storage contents of the diagnosis-and-recovery-result summing-up storage unit according to the storage contents of the analysis-condition storage unit, to decide into which one of the plurality of storage media the backup data for each data piece should be stored; and a backup-medium changing unit for changing a backup-data storage medium to store backup data therein among the plurality of storage media.

The computer connected to the computer network system according to the present invention which is connected to a computer subject to diagnosis and which specifically comprises a plurality of storage media and a control unit capable of replacing with backup data stored in the storage medium the data diagnosed to need recovery based on results of self-diagnosis performed on data usable by the computer itself comprises a control unit capable of performing at least one of the steps of: storing information which specifies recovered data into one of the plurality of storage media each time the diagnosis-object computer performs self-diagnosis; classifying data into information which specifies the recovered data and summing it up each time the diagnosis-object computer performs self-diagnosis; storing summing-up results into one of the plurality of storage media; analyzing the summing-up results according to given conditions, to decide into which one of the plurality of storage media the backup data for each data should be stored; and changing a storage medium to store the backup data therein among the plurality of storage media according to analysis results.

Also, in the above-mentions configuration of the computer connected to the computer network system according to the present invention, the plurality of storage media take mutually different times for reading out data stored therein, so that the backup-data-medium changing unit compresses data before storing it into a storage medium taking a relatively long read-out time.

Also, in the above-mentioned configuration of the computer connected to the computer network system according to the present invention, the conditions stored in the analysis-condition storage unit include a frequency and a number of times of recovering each data piece.

Such a computer connected to the computer network system according to the present invention uses a plurality of computers including a computer subject to diagnosis-and-recovery, to automatically classify data into backup data usable frequently by the recovery-object computer and not-immediately-required backup data and back them up in mutually different storage media. Specifically, the frequently-used backup data is backed up into a storage medium having a relatively high read-out speed and the not-immediately-required backup data, into a storage medium having a relatively low read-out speed. Further, the not-immediately-required backup data is compressed before being backed up into the storage medium.

Also, a recording medium according to the present invention is a computer-readable medium for storing a computer program which causes a computer to read out from a plurality of storage media, backup data for such data diagnosed to need recovery based on results of self-diagnosis performed on data usable by the computer itself, in order to replace the data with the read out backup data to thus recover the data, comprising: program code means for causing the computer to store information which specifies recovered data each time self-diagnosis is performed; program code means for causing the computer to classify information which specifies the recovered data stored and sum it up, each time self-diagnosis is performed; program code means for causing the computer to store the summing-up results; program code means for causing the computer to analyze the summing-up results according to given conditions, to decide into which one of the plurality of storage media the backup data for each data piece should be stored; and program code means for causing the computer to change a backup-data-storage medium among the plurality of storage media according to the analysis results.

The recordings medium according to the present invention further comprises such program code means that permits the computer to compress data before writing it into a storage medium, having a relatively large data read-out time, of the above-mentioned plurality of storage media.

Also, in the recording medium according to the present invention, the given conditions include a frequency and the number of times of recovering each data piece.

When the computer program recorded in such a recording medium according to the present invention is read into a general-purpose computer, the above-mentioned computer is realized; and when one or more of the respective program code means which constitute the computer program are read into the general-purpose computer, the above-mentioned computer connected to the computer network system is realized.

The above and further objects and features of the invention will more fully be apparent from the following detailed description with accompanying drawings.

BRIEF DESCRIPTION OF THE SEVERAL VIEWS OF THE DRAWING

FIG. 4 is a schematic diagram showing contents of a diagnosis-result log file;

FIG. 5 is a schematic diagram showing contents of a diagnosis-and-recovery-result log summing-up file;

FIG. 13 is a schematic diagram showing contents of a backup-region setting file;

FIG. 14 is another schematic diagram showing contents of the diagnosis-result log file;

FIG. 15 is another schematic diagram showing contents of the diagnosis-and-recovery-result log summing-up file;

FIG. 23 is a schematic diagram showing contents of a computer program recorded in a recording medium according to the present invention;

FIG. 24 is a schematic diagram showing other contents of the computer program recorded in the recording medium according to the present invention; and FIG. 25 is a schematic diagram showing further other contents of the computer program recorded in the recording medium according to the present invention.

DETAILED DESCRIPTION OF THE INVENTION

Figure 1:
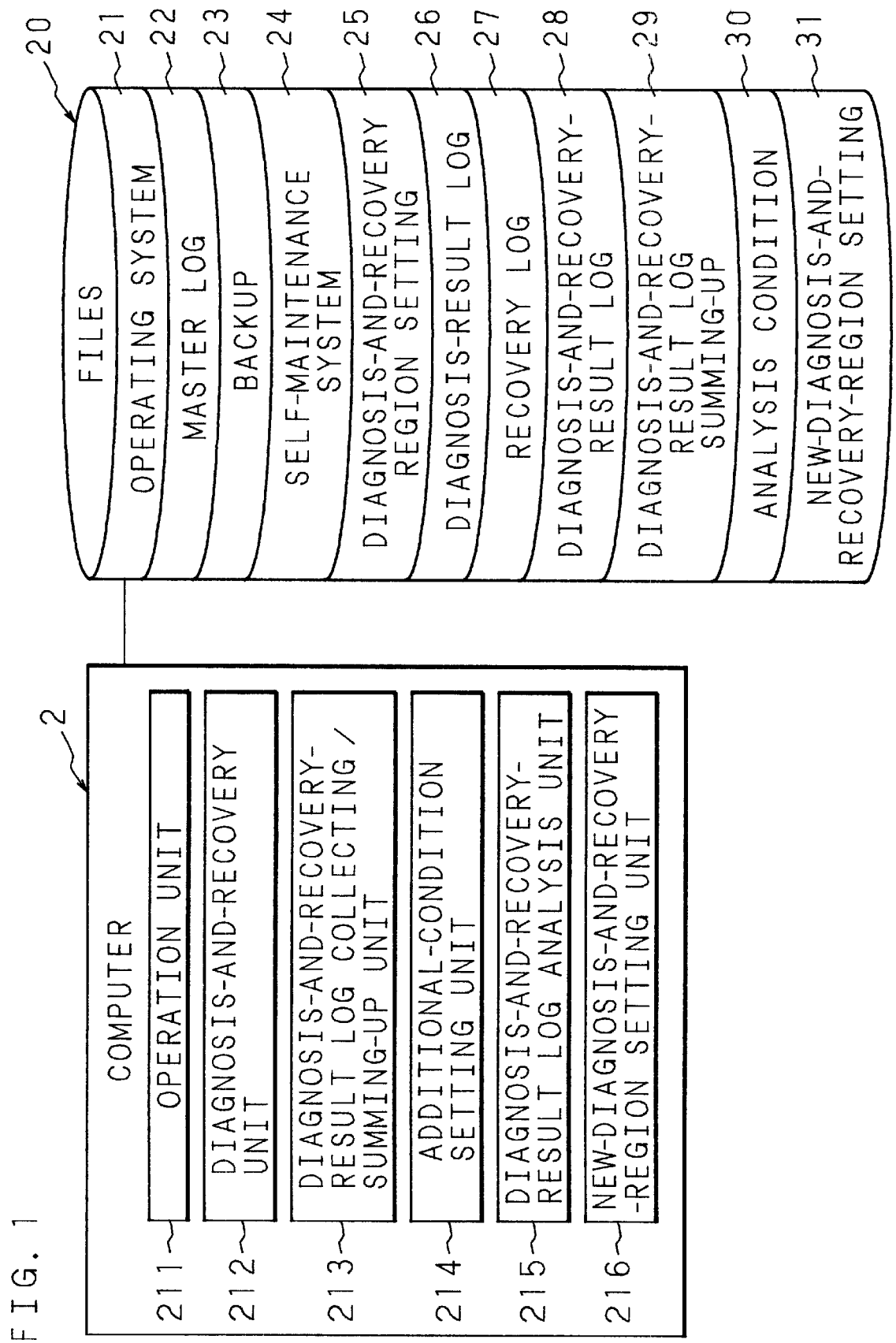
FIG. 1 is a block diagram showing an example of a configuration of a computer according to the present invention.

The following will detail the embodiments of the present invention with reference to the drawings. FIG. 1 is a block diagram showing a configuration example of a computer according to the present invention.

In FIG. 1, a reference numeral 2 indicates a computer, i.e. general-purpose personal computer which comprises such hardware components as: a CPU; a memory; a disk unit (hard disks, flexible disks etc.); a printer; a display; a keyboard; and a mouse, in such a configuration that a mass-capacity storage medium 20 is connected thereto which utilizes a hard disk, a magnetic tape, or other hardware storage. This storage medium 20 installs therein the OS (Operating System) and a variety of software products.

The storage medium 20 of the computer 2 stores therein such filed information as: an operating system file 21; a master log file 22; a backup file 23; a self-maintenance system file 24; a diagnosis-and-recovery-region setting file 25; a diagnosis-result log file 26; a recovery log file 27; a diagnosis-and-recovery-result log file 28; a diagnosis-and-recovery-result log summing-up file 29; an analysis-condition file 30; and a new-diagnosis-and-recovery-region setting file 31.

The operating system file 21 stores therein filed information such as the OS and various application software products required by the computer 2, in such a manner that when executed by the computer 2, the OS and these software products function as an operation unit 211. The operation unit 211 executes functions of the OS and general application software products such as, e.g. word processor or spread-sheet software when they are executed by the computer 2.

The master log file 22 holds an operation history of the computer 2, which is referred to in self-maintenance. The backup file 23 stores therein backup data of a folder/file to be subject to recovery in self-maintenance of the computer 2 itself.

The self-maintenance system file 24 stores therein filed information of a variety of software products required in self-maintenance of the computer 2 itself, which products, when executed by the computer 2, function respectively as a diagnosis-and-recovery unit 212; a diagnosis-and-recovery-result log collecting/summing-up unit 213; a additional-condition setting unit 214; a diagnosis-and-recovery-result log analysis unit 215; and a new-diagnosis-and-recovery-region setting unit 216.

The diagnosis-and-recovery-region setting file 25 stores therein information which specifies data (folder/file) which is decided to need diagnosis and recovery in self-maintenance of a variety of files of the computer 2.

The diagnosis-result log file 26 stores therein results of self-diagnosis performed by the diagnosis-and-recovery unit 212. The recovery log file 27 stores therein information which specifies data which is decided to need recovery based on contents of the diagnosis-result log file 26. The diagnosis-and-recovery-result log file 28 records therein results of recovery, if any performed according to contents of the recovery log file 27. Note here that the diagnosis-and-recovery-result log file 28 is created each time a self-maintenance function is performed.

The diagnosis-and-recovery-result log summing-up file 29 accumulates therein information (file name, folder name, etc.) which specifies recovered data and the number of times of recovering the data, each time self-maintenance is performed. The analysis-condition file 30 stores therein analysis conditions, for analyzing whether data of interest should be subject to recovery such as a frequency and the number of times of recovery. The new-diagnosis-and-recovery-region setting file 31 stores therein information which specifies data which is newly set as being subject to diagnosis and recovery, as a region subject to diagnosis and recovery.

Now, the following will describe internal functions of the computer 2 other than the operation unit 211. The diagnosis-and-recovery unit 212 performs self-diagnosis of the computer 2 itself at appropriate timing, for example, at the time of power on or when a user issues an instruction to that effect, so that the unit 212 may decide whether there is present some data which needs recovery using backup data and, if there is present such data, read out necessary data from the backup file 23 and rewrite the data with thus read out data for recovery.

The diagnosis-and-recovery-result log collecting/summing-up unit 213 adds contents of a newly created diagnosis-and-recovery-result log file 28 to the results to record contents of the diagnosis-and-recovery-result log summing-up file 29 and stores the results in the diagnosis-and-recovery-result log summing-up file 29, each time self-diagnosis is performed.

The additional-condition setting unit 214, when a user has set later-described additional conditions, sets the later-described additional conditions to results obtained by performing of analysis by the diagnosis-and-recovery-result log analysis unit 215.

The diagnosis-and-recovery-result log analysis unit 215 analyzes record contents of the diagnosis-and-recovery-result log summing-up file 29 according to contents of the analysis-condition file 30, to decide whether there is present data to be newly subject to diagnosis and recovery or whether there is present data not to be subject to diagnosis-and-recovery, each time self-maintenance is performed as many as the predetermined number of times. Results of this analysis are recorded in the new-diagnosis-and-recovery-region setting file 31.

The new-diagnosis-and-recovery-region setting unit 216 updates contents of the diagnosis-and-recovery-region setting file 25, the operating system file 21, the master log file 22, and the backup file 23 according to recorded contents of the new-diagnosis-and-recovery-region setting file 31.

Figure 2:
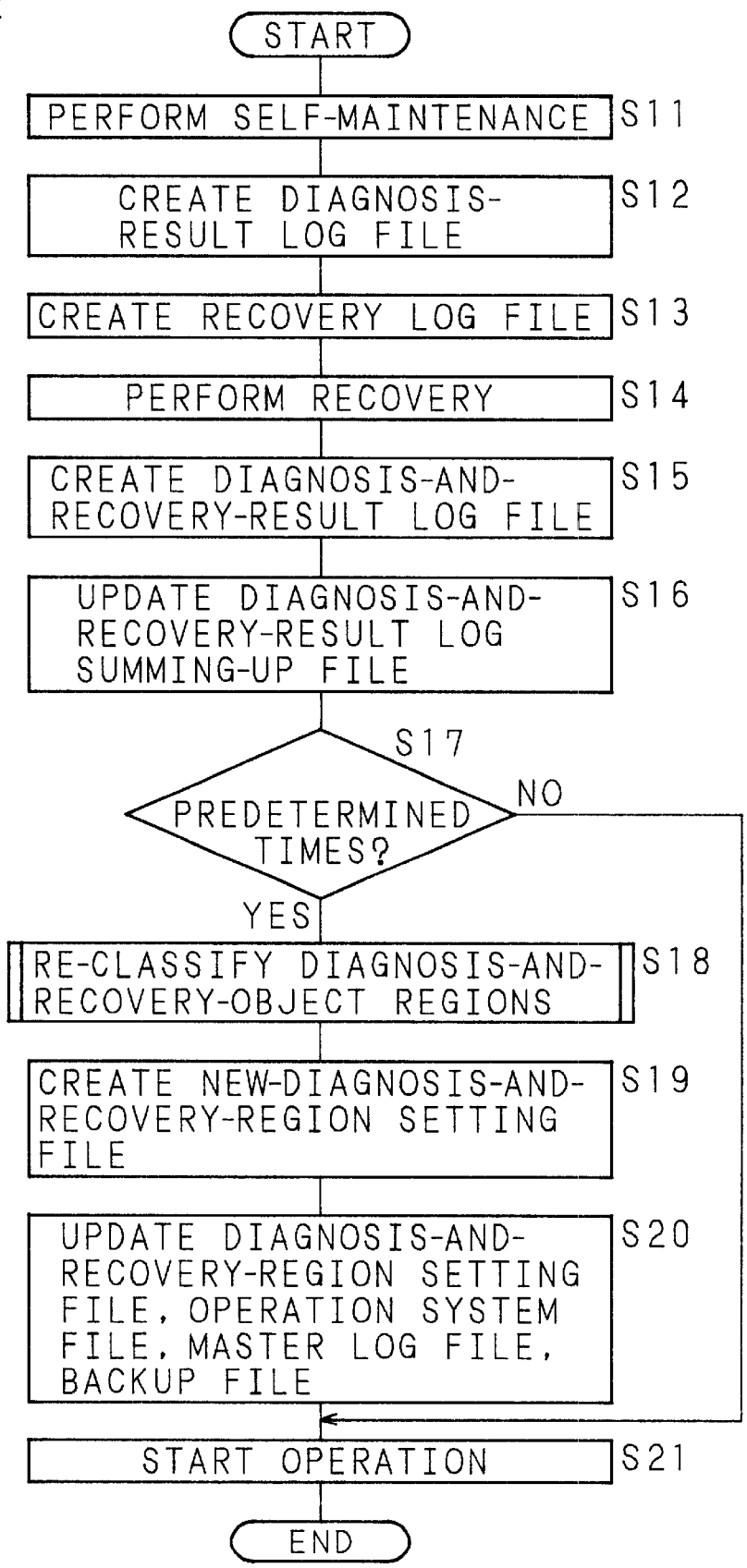
FIG. 2 is a flowchart showing a procedure for self-maintenance processing of the computer according to the present invention.

FIG. 2 shows a flowchart showing a self-maintenance processing procedure of a computer according to the present invention. The following will describe the self-maintenance processing of the computer 2 with reference to FIG. 2.

When power is applied to the computer 2 to activate it, first the diagnosis-and-recovery unit 212 is activated by software for self-diagnosis saved in the self-maintenance system file 24 of the computer 2. Then, self-maintenance is performed on the computer 2 by the diagnosis-and-recovery unit 212 (step S11). Note here that in the embodiment of the present invention, not only upon power application but at any time maintenance is possible to perform, the same self-maintenance processing as above can be performed at any given time when a user instructs to do so.

Each time self-diagnosis is performed by the diagnosis-and-recovery unit 212, contents of the operating system file 21 and those of the master log file 22 are compared to each other, to decide whether there has been made a change or new creation of a system configuration of the computer 2, i.e. a folder/file of software etc., in order to create a diagnosis-result log file 26 (step S12). Then, based on the contents of thus newly created diagnosis-result log file 26 and storage contents of the diagnosis-and-recovery-region setting file 25, i.e. information which specifies data subject to diagnosis and recovery, a recovery log file 27 is created that records therein the information which specifies such data that actually needs recovery (step S13).

Figure 3:
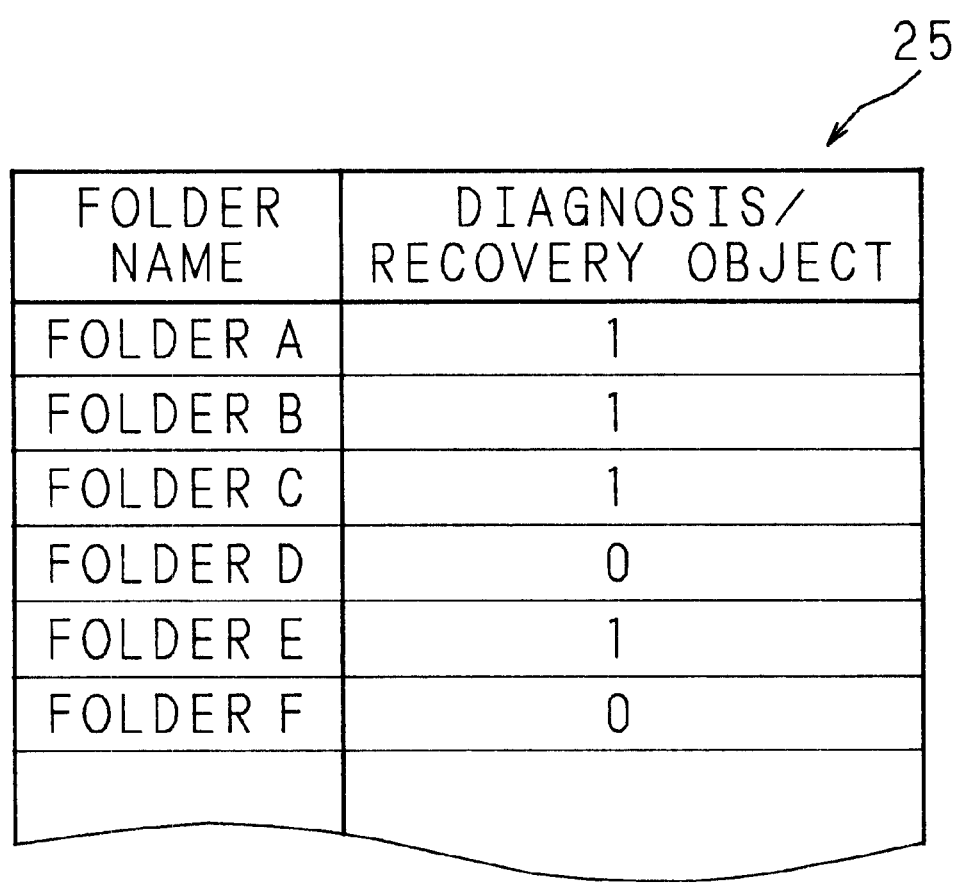
FIG. 3 is a schematic diagram showing contents of a diagnosis-and-recovery region setting file.

For example, FIG. 3 is a schematic diagram showing contents of the diagnosis-and-recovery-region setting file 25. As shown in the schematic diagram of FIG. 3, in the diagnosis-and-recovery-region setting file 25, folders A, B, C, . . . store therein "1" when they are subject to diagnosis and recovery respectively and otherwise "0." For example, FIG. 4 is a schematic diagram which shows contents of the diagnosis-and-recovery-result log file 26. As shown in the schematic diagram of FIG. 4, files A1, A2, . . . of the folder A and files B1, B2, . . . of the folder B store therein "1" when they are respectively diagnosed to nee recovery and otherwise, "0." Based on storage contents of such a diagnosis-and-recovery-region setting file 25 and those of the diagnosis-result log file 26, information which specifies data which actually needs recovery is recorded in the recovery log file 27.

According to contents of thus newly created recovery log file, backup data of the data (folder/file) which needs recovery is read out by the diagnosis-and-recovery unit 212 and re-installed in the operating system file 21, thus recovering portions which needs recovery (step S14) to create a diagnosis-and-recovery-result log file 28 which records therein the results of this recovery processing (step S15). Note here that this diagnosis-and-recovery-result log file 28 is newly created each time a self-maintenance function is performed.

When the diagnosis-and-recovery-result log file is thus created, the contents of the file are summed up by the diagnosis-and-recovery-result log collecting/summing unit 213 in units a drive, folder, or file, the results of which are in turn added to the current contents of the diagnosis-and-recovery-result log summing-up file 29, thus updating the diagnosis-and-recovery-result log summing-up file 29 (step S16). Then, the diagnosis-and-recovery-result log analysis unit 215 classifies diagnosis-and-recovery-object regions based on the contents of the diagnosis-and-recovery-result log summing-up file 29, the analysis-condition file 30, and the master log file 22 (step S18). Specifically, the analysis unit 215 classifies data of interest into such data pieces that are newly subject to diagnosis and recovery and such data pieces that are not subject to diagnosis-and-recovery processing newly.

FIG. 5 is a schematic diagram showing contents of the diagnosis-and-recovery-result log summing-up file 29. In this example, the number of times and a frequency of recovery operations performed are recorded of the files A, A2, . . . of the folder A and the files B1, B2, . . . of the file B.

However, processing by the diagnosis-and-recovery-result log analysis unit 215 is performed once each time self-diagnosis by the diagnosis-and-recovery unit 212 is performed as many as the predetermined number of times (step S17). Also, in the processing by the diagnosis-and-recovery-result log analysis unit 215, by user making settings through the additional-condition setting unit 214 to change settings of the analysis-condition file 30 beforehand, it is possible to classify regions subject to diagnosis and recovery in such a manner as to reflect the user's intention.

Figure 6:
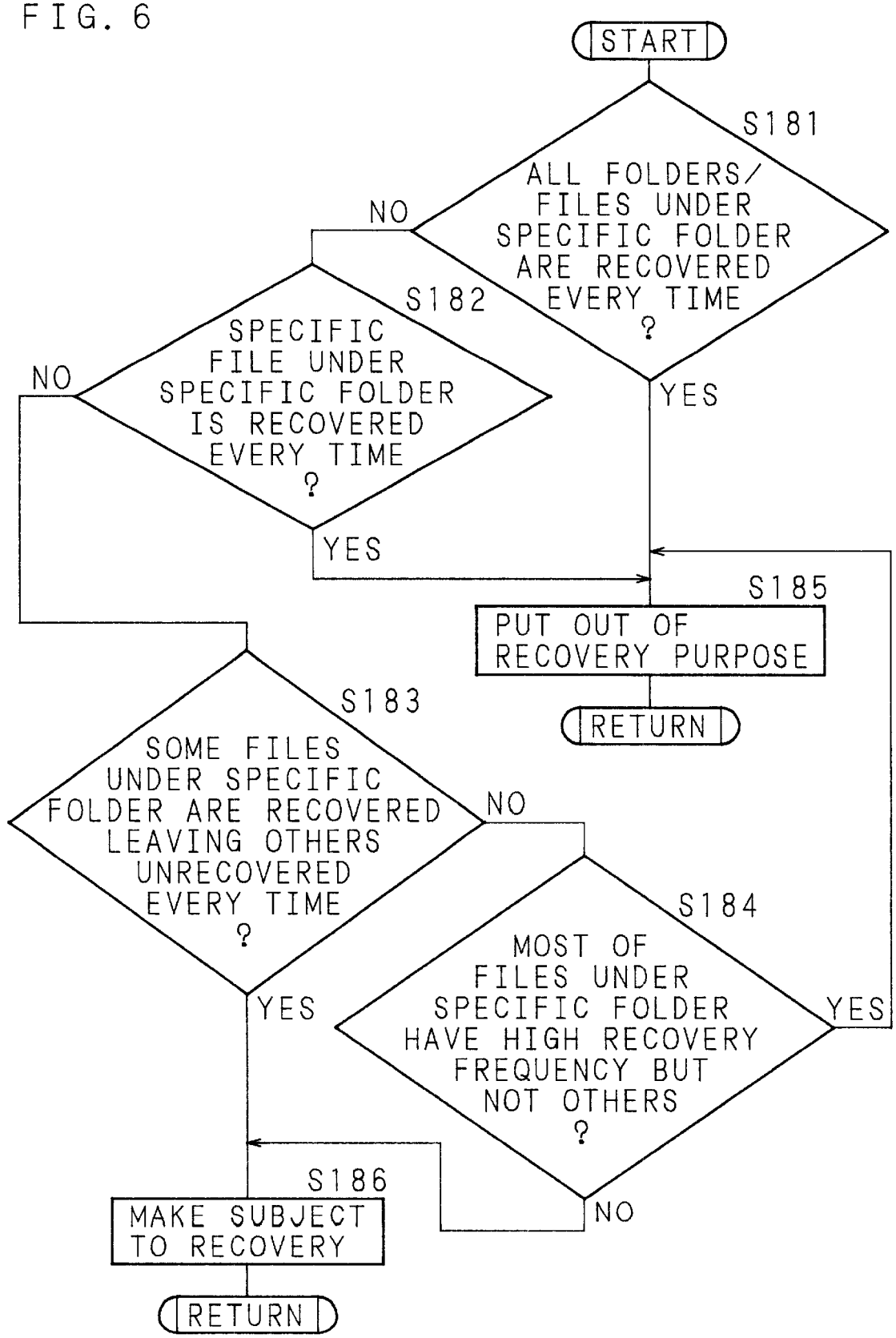
FIG. 6 is a flowchart showing a procedure for maintenance processing of the computer according to the present invention.

The following will describe the above-mentioned classification processing by the diagnosis-and-recovery-result log analysis unit 215, with reference to a flowchart of FIG. 6 which shows details of the processing performed at step S18.

In a first case where all folders/files under the control of a specific folder have been recovered every time self-diagnosis is performed ("YES" at step S181), the specific folder is put out of recovery purpose (step S185). More specifically, for example, to the specific folder, a temp folder of OS or a cache folder of the Internet browser corresponds. The temp folder of the OS is generally rewritten each time the computer 2 is operated and the cache folder of the Internet browser is always rewritten every time the browser is used, so that they are recovered when usual self-diagnosis is performed. Yet, therefore, these folders need not be recovered each time self-diagnosis is performed.

In a second case where a specific file under the control of a specific folder has been recovered each time self-diagnosis is performed ("YES" at step S182), the specific file is put out of recovery purpose (step S185). More specifically, for example, this holds true with a swap file of the OS etc. An OS swap file is generally created newly when the computer 2 is operated, and so need not be recovered each time self-diagnosis is performed.

In a third case where some files under the control of a specific folder have been recovered leaving the others not recovered each time self-diagnosis is performed ("YES" at step S183), that specific folder is made subject to recovery (step S186). A fact that some files under the control of a specific folder have been recovered each time self-diagnosis is performed means that they need recovery also in general self-diagnosis and so are made subject to recovery.

In a fourth case where most of files under the control of a specific folder have a high recovery frequency but not the others ("YES" at step S184), that specific folder is basically out of recovery object, leaving the final decision is up to the user though.

If none of the above-mentioned steps of S181, S182, S183, and S184 holds true ("NO" at step S184), the concerned folder is made subject to recovery (step S186).

Note here that preferably the user be able to decide whether, as an additional condition, folders/files newly put out of diagnosis-and-recovery purpose are all to be deleted including backup data or left as they are. Also preferably, such folders/files newly put out of diagnosis-and-recovery purpose are set as previous beforehand if they are highly likely to be the OS or application-software system files.

When the diagnosis-and-recovery-result log analysis unit 215 has thus completed classification, the results are written into the diagnosis-and-recovery-region setting file 31 (step S19), according to which the new-diagnosis-and-recovery-region setting unit 216 updates the diagnosis-and-recovery-region setting file 25, the operating system file 21, the master log file 22, and the backup file 23 (step S20). With this, the diagnosis-and-recovery-region setting file 25 records therein information which specifies data to be subject to diagnosis and recovery when self-diagnosis is performed next time, so that at the next diagnosis-and-recovery, only the data specified by the information thus recorded in the diagnosis-and-recovery-region setting file 25 is made subject to diagnosis and recovery.

If, for example, the folder B recorded in the diagnosis-and-recovery-result log summing-up file 29 shown in the schematic diagram of FIG. 5 corresponds to the above-mentioned first case, the "1" which corresponds to the folder B of contents of the diagnosis-and-recovery-region setting file 25 shown in the schematic diagram of FIG. 3 is rewritten by "0." Then, the computer 2 is put into actual operational condition (step S21). Note here that if the number of times of performing self-maintenance does not reach the predetermined number of times at step S17, the computer 2 is immediately put into an operational condition.

Although the present invention has been applied to a stand-alone-type computer in the above-mentioned embodiment, any computer may be used instead as far as it is connected to the network when the computer itself performs the above-mentioned processing.

Figure 7:
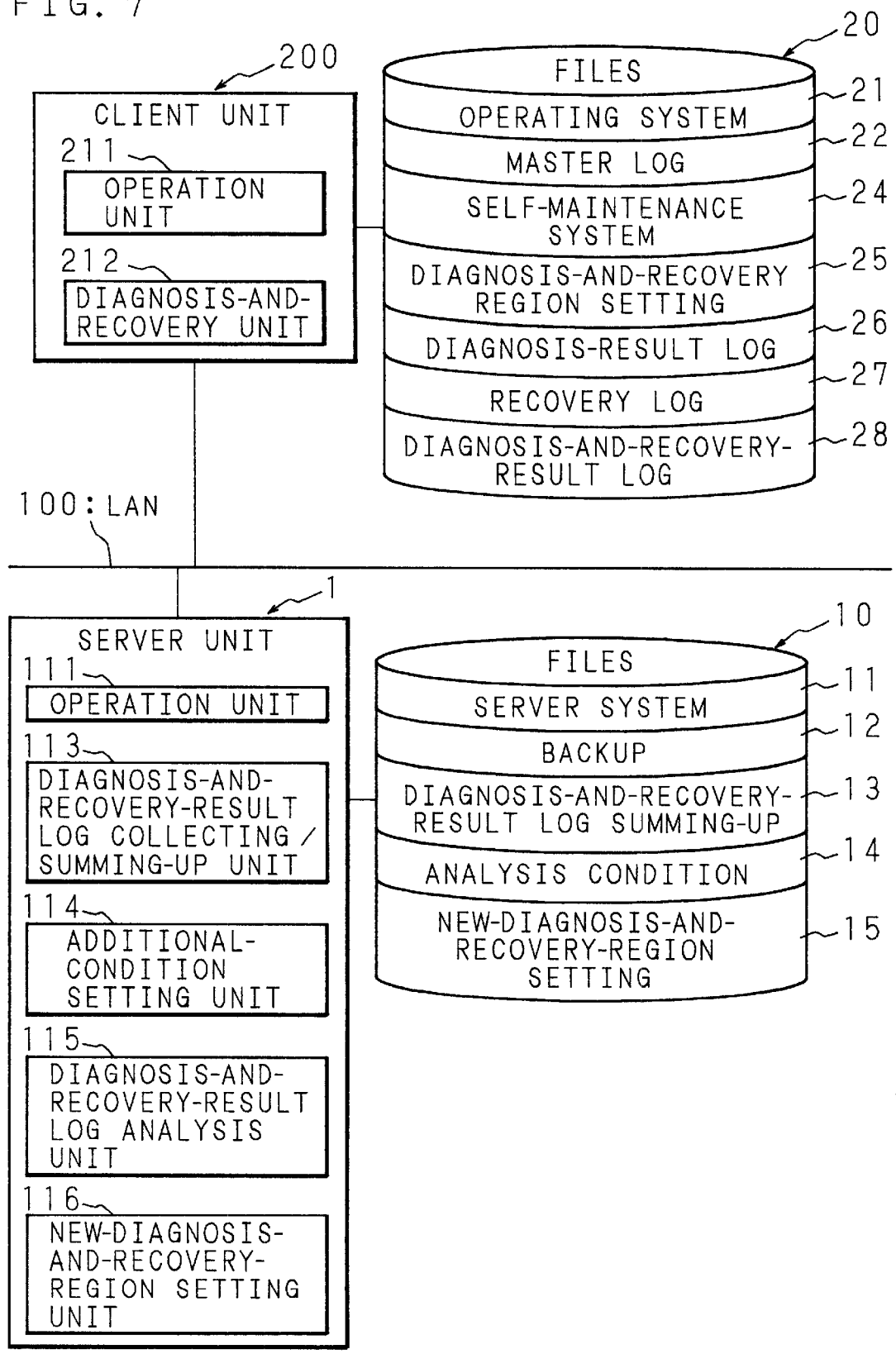
FIG. 7 is a block diagram showing an example of a configuration of a computer network system according to the present invention.

Although the present invention has been applied to a stand-alone-type computer in the above-mentioned embodiment, the present invention can of course be applied to a system, for example, a computer network system such as a client/server system where a plurality of computers are connected to a network. FIG. 7 is a block diagram of a configuration example of such a computer network system related to the present invention. Note here that in this example, a configuration example of a client/server system is shown as one example of the computer network system according to the present invention.

In FIG. 7, a reference numeral 1 indicates a server unit and a reference numeral 200 indicates a client unit, both of which are interconnected with a LAN 100. Although both the server unit 1 and the client unit 200 are both shown only one each in FIG. 7, each of them can be given more than two and connected with the LAN 100.

The server unit 1 is a general-purpose personal computer which comprises as hardware: a CPU; a memory; a disk unit (hard disk, flexible disk etc.); a printer; a display; a keyboard; and a mouse, in such a configuration that it has a mass-capacity storage medium 10 utilizing hardware such as a hard disk or a magnetic tape connected thereto. The storage medium 10 installs therein the OS (operating System) and a variety of software products.

The storage medium 10 of the server unit 1 has other than a server system file 11 which stores therein files of the OS and a variety of application software products necessary for operations of the server unit 1 itself, in place of the client unit 200, the backup file 23, the diagnosis-and-recovery-result log summing-up file 29, the analysis-condition file 30, and the new-diagnosis-and-recovery-region setting file 31 collectively which are all provided to the stand-alone-type computer itself shown in FIG. 1, in the forms of a backup file 12, a diagnosis-and-recovery-result log summing-up file 13, an analysis-condition file 14, and a new-diagnosis-and-recovery-region setting file 15 respectively.

Also, the functions of the diagnosis-and-recovery-result log collecting/summing-up unit 213, the additional-condition setting unit 214, the diagnosis-and-recovery-result log analysis unit 215, and the new-diagnosis-and-recovery-region setting unit 216 which are all provided to the stand-alone-type computer itself shown in FIG. 1 are given as functions of the server unit 1 in a client/server system in the forms of a diagnosis-and-recovery-result log collecting/summing-up unit 113, an additional-condition setting unit 114, a diagnosis-and-recovery-result log analysis unit 115, and a new-diagnosis-and-recovery-region setting unit 116 respectively.

In the client/server system, therefore, the client unit 200 itself has only an operation unit 211 and a diagnosis-and-recovery unit 212, while a storage medium 20 of the client unit holds therein a operating system file 21, a master log file 22, a self-maintenance system file 24, a diagnosis-and-recovery-region setting file 25, a diagnosis-result log file 26, a recovery log file 27, and a diagnosis-and-recovery-result log file 28.

Figure 8:
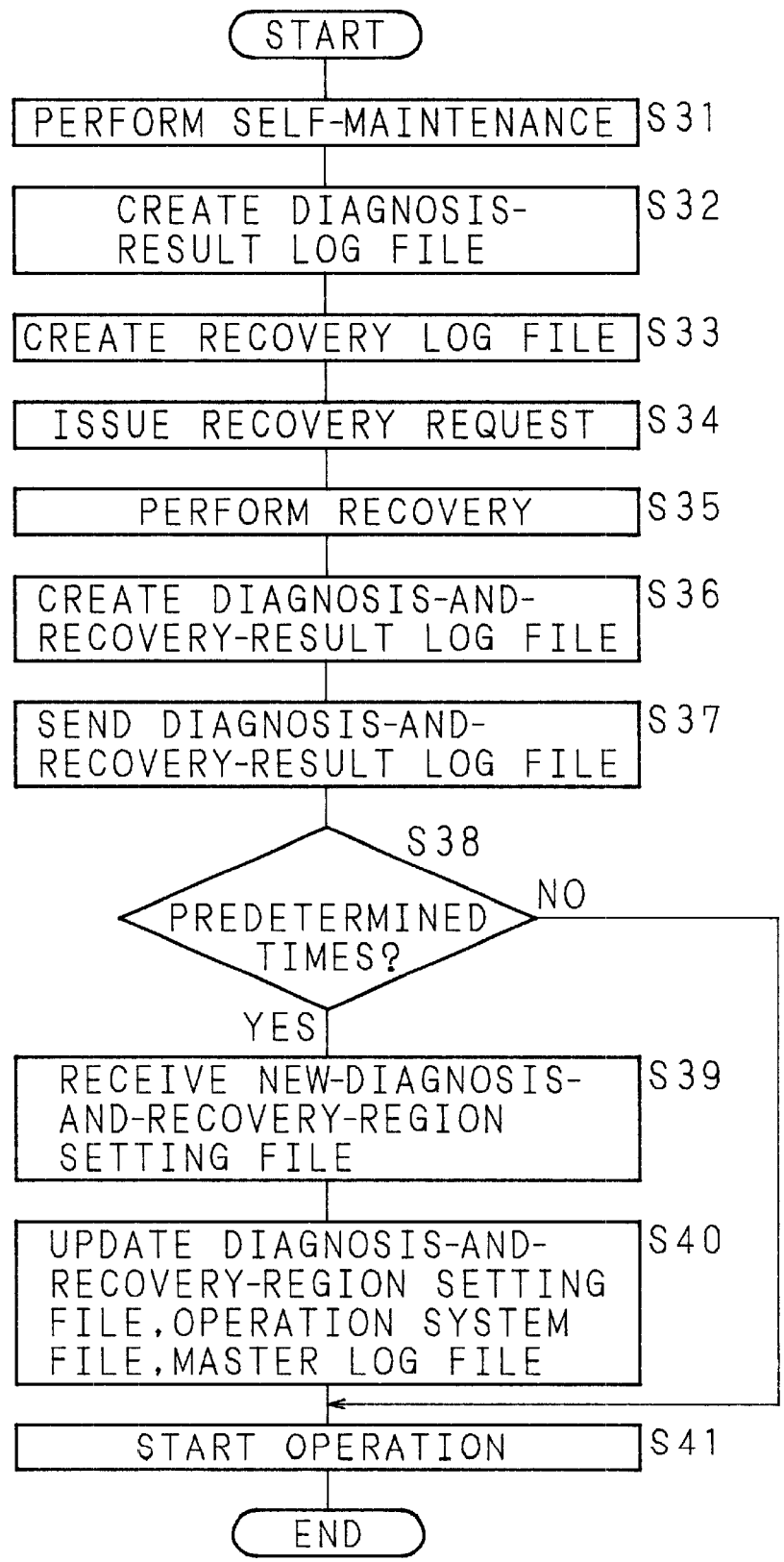
FIG. 8 is a flowchart showing a processing procedure performed at a client unit in the computer network system according to the present invention.
Figure 9:
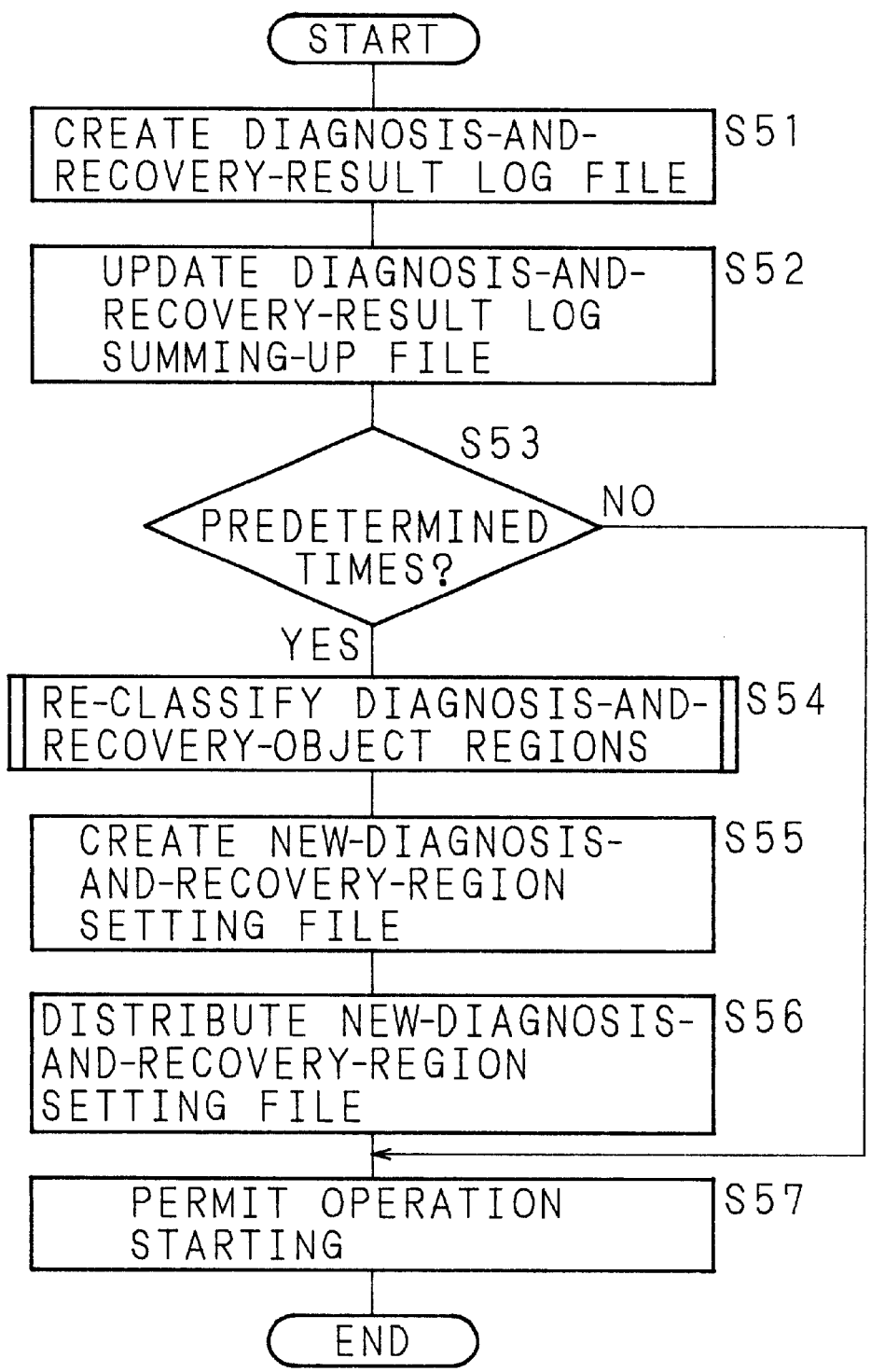
FIG. 9 is a flowchart showing a processing procedure performed at a server unit in the computer network system according to the present invention.

The following will describe a processing procedure followed in a case where the present invention is applied to a client/server system as one example of such a computer network system, with reference to a flowchart shown in FIG. 8 which shows a processing procedure followed by the client unit 200 in the computer network system related to the present invention as well as a flowchart shown in FIG. 9 which shows a processing procedure followed by the server unit 1 in the computer network system related to the present invention.

Each client unit 200 uses its diagnosis-and-recovery unit 212 to perform self-diagnosis for itself (step S31), to create a diagnosis-result log file 26 (step S32) and also a recovery log file 27 (step S33) and, based on these files, issues a recovery request to the server unit (step S34).

In response to the recovery request thus issued from the client unit 200, the server unit 1 reads out the requested backup data from the backup file 12 of its own storage medium 10 and sends it over to the client unit 200, so that the client unit downloads the backup data from the server unit 1 and recovers the data (step S35), to create a diagnosis-and-recovery-result log file 28 (step S36). The diagnosis-and-recovery-result log file 28 in sent to the server unit 1 (step S37). Then, the client unit 200 enters a standby state to wait until it receives operation-start permission from the server unit 1 (step S38).

At the server unit 1, on the other hand, the diagnosis-and-recovery-result log collecting/summing-up unit 113 sums up the diagnosis-and-recovery-result log file 28 of each client unit 200 (step S51) to update the diagnosis-and-recovery-result log summing-up file 13 (step S52), so that when such processing has been performed as many as the predetermined number of times, in other words, when self-maintenance processing for the client/server system has not been performed as many as the predetermined number of times ("NO" at step S53), permission for operation starting is immediately issued to each client unit 200 (step S57).

In this case, each client unit 200, which is in a standby state waiting for operation-start permission at step S38, immediately enters an operation-start state (step S41).

If, on the other hand, the self-maintenance processing has been performed as many as the predetermined number of times at step S53 ("YES" at step S53), the server unit 1 performs analysis on each client unit 200 by the diagnosis-recover-result log analysis unit 115 to re-classify diagnosis-and-recovery regions (step S54), according to the results of which the new-diagnosis-and-recovery-region setting unit 116 creates a new-diagnosis-and-recovery-region setting file 15 concerning each client unit 200 (step S55) and distributes the results to each client unit 200 (step S56). Then, finally, the server unit 1 offers operation-start permission to each client unit 200 (step S57).

Each client unit 200, on the other hand, when it receives a new-diagnosis-and-recovery-region setting file 15 distributed thereto (step S39), updates its own diagnosis-and-recovery-region setting file 25, operating system file 21, and master log file 22 (step S40), so that when it then receives operation-start permission from the server unit 1, each client unit 200 enters an operational state (step S41).

Figure 10:
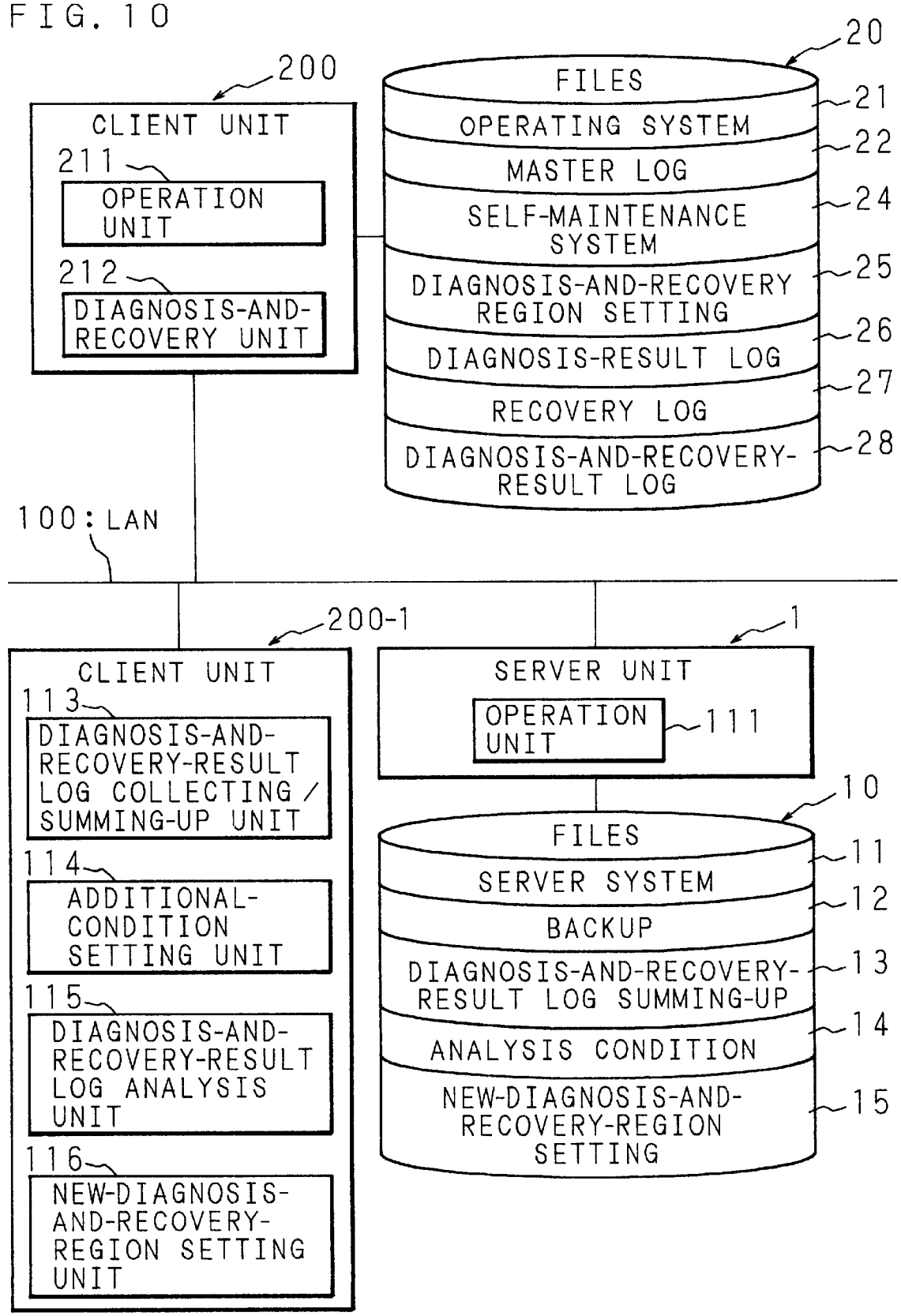
FIG. 10 is a block diagram showing another configuration example of the computer network system according to the present invention.

FIG. 10 is a block diagram which shows another embodiment of the computer network system according to the present invention. In this embodiment, the diagnosis-and-recovery-result log collecting/summing-up unit 113, the additional-condition setting unit 114, the diagnosis-and-recovery-result log analysis unit 115, and the new-diagnosis-and-recovery-region setting unit 116 of the functions provided to the server unit 1 shown in FIG. 7 are given not to the client unit 200 but to, for example, a second client unit 200-1 used by, for example, a manager for system management. Note here that the backup file 12, the diagnosis-and-recovery-result log summing-up file 13, the analysis-condition file 14, and the new-diagnosis-and-recovery-region setting file 15 are saved in the storage medium 10 of the server unit 1.

In a computer network system such as shown in FIG. 10, necessary files are saved beforehand in the mass-capacity storage medium 10 of the server unit 1, to make it easy for the manager to make various settings via the client unit 200-1.

Note here that not only in the above-mentioned configuration shown in FIG. 10 but in other appropriate configurations, each function provided to the client unit 200-1 and each file saved in the storage medium 10 of the server unit 1 can of course be distributed to a plurality of computers, connected to the LAN 100 as a network, including the client units 200 subject to diagnosis and the server unit Although in the above-mentioned embodiment, each time the computer performs self-maintenance as many as the predetermined number of times or each time each client unit of the client/server system performs self-maintenance as many as the predetermined number of times, the diagnosis-and-recovery-region setting file 25 is re-set, the re-setting may of course be performed not only each time a user issues an instruction to that effect but each time a predetermined lapse of time (e.g., one day, one week, etc.) elapses.

Figure 11:
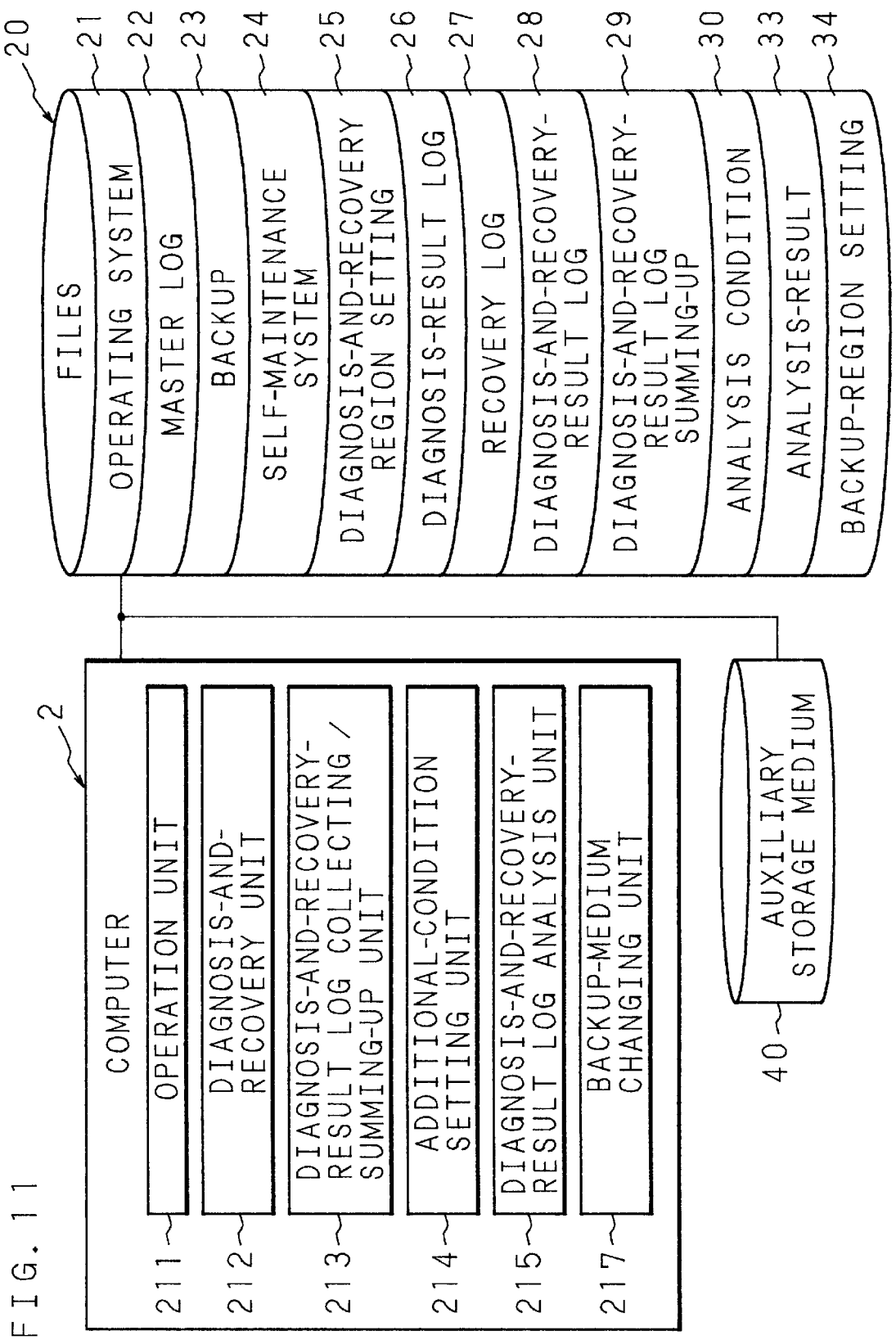
FIG. 11 is a block diagram showing another configuration example of the computer according to the present invention.

In FIG. 11, a reference numeral 2 indicates a computer which is a general-purpose computer comprising as hardware a CPU, a memory, a disk unit (hard disks, flexible disks, etc.), a printer, a display, a display, a keyboard, a mouse and the like and to which is connected the mass-capacity storage medium 20 which utilizes a hard disk. The storage medium 20 installs therein the OS (Operating System) and a variety of software products. Further, to the computer 2 are connected a mass-capacity auxiliary storage medium 40 for storing compressed backup-data which utilizes such hardware as a magnetic tape, CD-R, MD, etc. The auxiliary storage medium 40 saves, as compressed, backup data which has a low recovery frequency, i.e. low use-frequency and/or backup data of such data that need not undergo backup operations usually.

The storage medium 20 of the computer 2 stores therein filed information such as an operating system file 21, a master log file 22, a backup file 23, a self-maintenance system file 24, a diagnosis-and-recovery-region setting file 25, the diagnosis-result log file 26, a recovery log file 27, a diagnosis-recovery-result log file 28, a diagnosis-and-recovery result log summing-up file 29, a analysis-condition file 30, a analysis-result file 33, and a backup-region setting file 34.

The operating system file 21 stores therein files of the OS and a variety of application software products necessary for usual operations of the computer 2, so that when they are executed by the computer 2, they function as the operation unit 211. The operation unit 211 executes functions of the OS and other general application software products, for example, a word processor, a spread sheet, when they are run by the computer 2.

The master log file 22 holds therein the operational history of the computer 2, which is referred to self-maintenance. The backup file 23 stores therein backup data of such data, that has a high recovery frequency, of data (folders/files) subject to self-maintenance of the computer 2 itself, i.e. backup data having a high use frequency.

The self-maintenance system file 24 stores therein files of various software products necessary for self-maintenance of the computer 2 itself, which products, when executed by the computer 2, function as the diagnosis-and-recovery unit 212, the diagnosis-and-recovery-result log collecting/summing-up unit 213, the additional-condition setting unit 214, the diagnosis-and-recovery-result log analysis unit 215, and the backup-medium changing unit 217.

The diagnosis-and-recovery-region setting file 25 stores therein the information which specifies data (folder/files), decided to need diagnosis and recovery in self-maintenance, from among data stored in the backup file 23.

The diagnosis-result log file 26 stores therein results of self-diagnosis performed by the diagnosis-and-recovery unit 212. The recovery log file 27 records therein information which specifies data decided that recovery in necessary, according to the contents of the diagnosis-result log file 26. The diagnosis-and-recovery-result log file 28 records therein results of recovery if recovery has been performed according to the contents of the recovery log file 27. Note here that the diagnosis-and-recovery-result log file 28 is created each time self-maintenance is performed.

The diagnosis-and-recovery-result log summing-up file 29 accumulates therein information (file name, folder name, etc.) which specifies recovered data and the number of times of recovery operations performed etc. Specifically, the diagnosis-and-recovery-result log summing-up file 29 accumulates therein the contents of the diagnosis-and-recovery-result log file 28 which is created each time self-maintenance is performed.

The analysis-condition file 30 stores therein analysis conditions, e.g. a frequency and the number of times of recovery operations, based on which it decides whether each data piece should be saved in the backup file 23 or in the auxiliary storage medium 40. The analysis-result file 33 stores information which specifies such data that its backup region has been newly changed from the backup file 23 to the auxiliary storage medium 40.

The backup-region setting file 34 stores therein information which specifies which one of the backup file 23 and the auxiliary storage medium 40 currently saves backup data of each of such data pieces whose information that specifies it as subject to diagnosis and recovery is stored in the diagnosis-and-recovery-region setting file 25.

Next, internal functions, other than the operation unit 211, of the computer 2 are described. The diagnosis-and-recovery unit 212 performs self-diagnosis for itself at appropriate timing, for example, upon power application or when a user issues an instruction to that effect, to decide whether there is present such data that needs recovery by use of backup data and, if there is, decides an appropriate backup region for that backup data, more specifically, it decides whether the appropriate backup region should be the backup file 23 or the auxiliary storage medium 40, based on storage contents of the backup-region setting file 34, to read out necessary backup data and then rewrite the data with this backup data for recovery.

The diagnosis-and-recovery-result log collecting/summing-up unit 213 adds the contents of a newly created diagnosis-and-recovery-result log file 28 to the storage contents of the diagnosis-and-recovery-result log summing-up file 29, each time self-maintenance is performed.

The additional-condition setting unit 214 is provided to permit the user to set conditions for analysis by the diagnosis-and-recovery-result log analysis unit 215, thereby storing thus set conditions in the analysis-condition file 30.

Each time predetermined conditions are satisfied, for example, each time self-maintenance is performed the predetermined number of times or a predetermined lapse of time has elapsed, the diagnosis-and-recovery-result log analysis unit 215 analyzes the storage contents of the diagnosis-and-recovery-result log summing-up file 29 according to the contents of the analysis-condition file 30, to decide whether there is such backup data that its backup region should be changed from the backup file 23 to the auxiliary storage medium 40. If there is such data that its backup region should be changed from the backup file 23 to the auxiliary storage medium 40, the diagnosis-and-recovery-result log analysis unit 215 stores information which specifies the data in the analysis-result file 33.

According to the storage contents of the analysis-result file 33, i.e. the information which specifies such data that its backup region should be changed from the backup file 23 to the auxiliary storage medium 40, the backup-medium changing unit 217 reads out the corresponding data from the backup file 23 and then compresses the data and saves it in the auxiliary storage medium 40, and also rewrites the contents of the backup-region setting file 34, i.e. settings of the backup region of that backup data.

Figure 12:
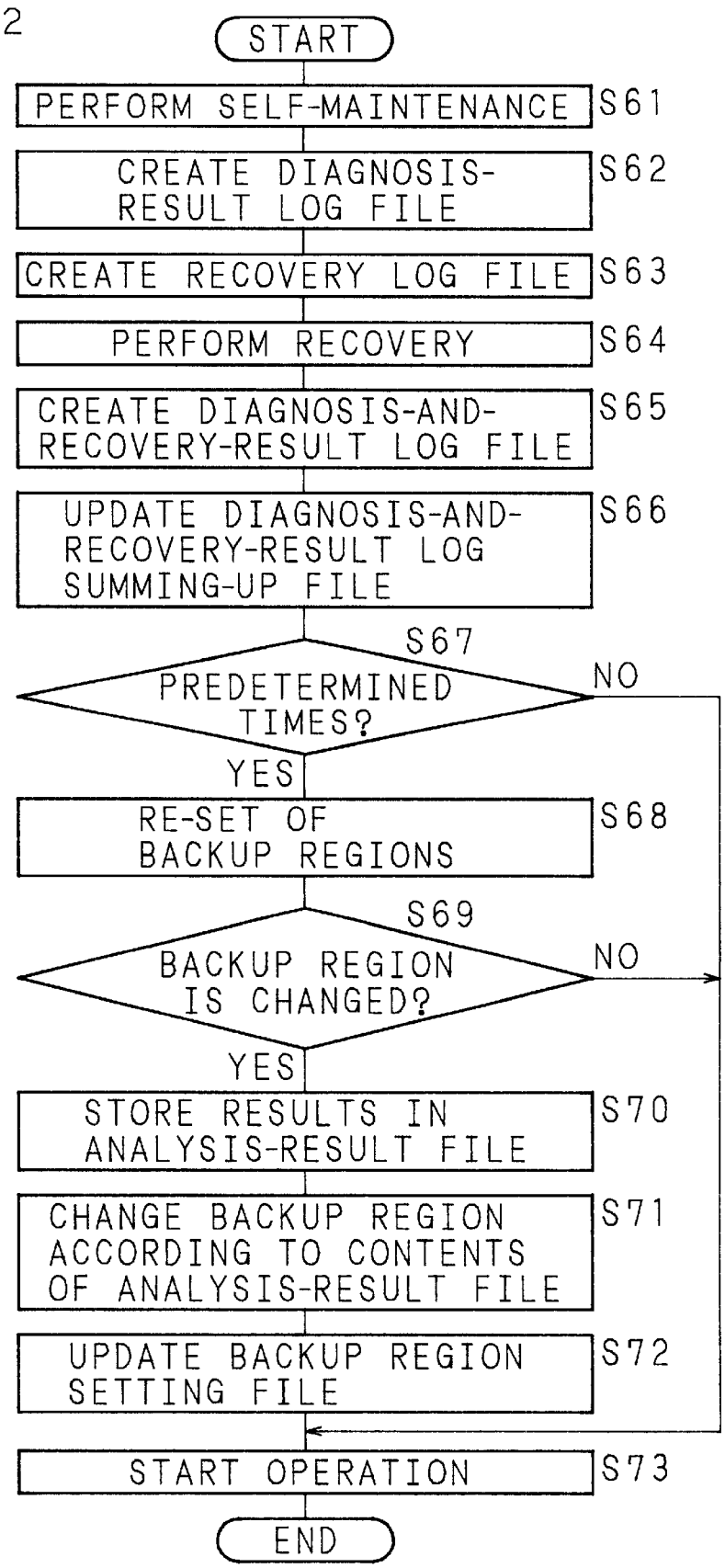
FIG. 12 is a flowchart showing another self-maintenance processing procedure of the computer according to the present invention.

FIG. 12 is a flowchart which shows another self-maintenance processing procedure for the computer according to the present invention. The following will describe self-maintenance of the computer 2 with reference to a flowchart of FIG. 12.

When power is applied to the computer 2 to be activated, the diagnosis-and-recovery unit 212 is activated by self-diagnosis software saved in the self-maintenance system file 24 of the computer 2. Thus, the diagnosis-and-recovery unit 212 performs self-diagnosis on the computer 2 (step S61). In the present embodiment, however, almost the same self-maintenance can be performed not only upon power application but at any time as far as maintenance processing is possible to be performed when the user issues an instruction to that effect.

By permitting the diagnosis-and-recovery unit 212 to perform self-diagnosis, contents of the operation system file 21 and those of the master log file 22 are compared to each other, to decide whether a system configuration of the computer 2, i.e. folders/files of its software etc. have been changed or newly created, thus creating a diagnosis-result log file 26 (step S62). Based on the contents of thus newly created diagnosis-result log file 26 and storage contents of the diagnosis-and-recovery-region setting file 25, i.e. information which specifies data made subject to diagnosis and recovery, a recovery log file 27 is created which records therein information which specifies data which actually needs recovery (step S63).

According to the contents of thus newly created recovery log file 27, the diagnosis-and-recovery unit 212 reads out from the backup-region setting file 34 such information that specifies which one of the backup file 23 and the auxiliary storage medium 40 the backup data of the data (folders/files) which needs recovery is saved in. If the backup data of the data which needs recovery is saved in the backup file 23, the diagnosis-and-recovery unit 212 reads out that backup data from the backup file 23 and, if that backup data is saved in the auxiliary storage medium 40, it reads out that backup data from the auxiliary storage medium 40, and then decompresses it and re-install it to the operating system file 21, to recover such portions that need recovery (step S64). Subsequently, a diagnosis-and-recovery-result log file 28 is created which records therein recovery results (step S65). Note here that the diagnosis-and-recovery-result log file 28 is newly created each time self-maintenance is performed.

FIG. 13 is a schematic diagram which shows contents of the backup-region setting file 34. As shown in the schematic diagram of FIG. 13, in the backup-region setting file 34, the folders A, B, . . . store therein "1" when the backup region is the backup file 23 and "0" when it is the auxiliary storage medium 40.

Figure 14:
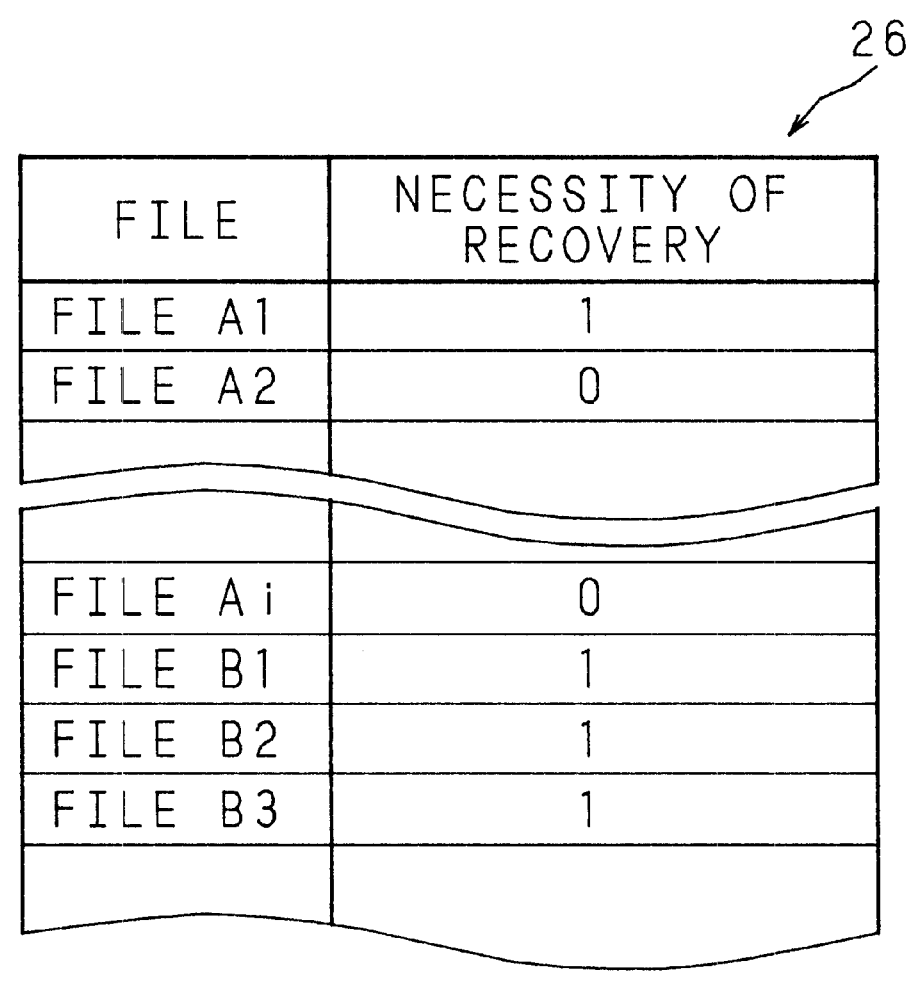

FIG. 14 is another schematic diagram of the contents of the diagnosis-result log file 26. As shown in the schematic diagram of FIG. 14, the diagnosis-result log file 26, it is assumed that the files A1, A2, . . . of the folder A and the files B1, B2, . . . of the folder B stores therein "1" if it is diagnosed that recovery is necessary based on results of self-diagnosis and "0" otherwise. Based on such storage contents of the diagnosis-result log file 26 and those of the diagnosis-and-recovery-region setting file 25, information which specifies such data that actually needs recovery is stored in the recovery log file 27.

When the diagnosis-and-recovery-result log file 28 is thus created, the contents are summed up in units of a drive, folder, or file by the diagnosis-and-recovery-result log collecting/summing-up unit 213, results of which is in turn added to the current contents of the diagnosis-and-recovery-result log summing-up file 29, thus updating the diagnosis-and-recovery-result log summing-up file 29 (step S66). Then, based on the contents of the diagnosis-and-recovery-result log summing-up file 29 and those of the analysis-condition file 30, the diagnosis-and-recovery-result log analysis unit 215 re-sets the backup region (step S68). More specifically, it is decided whether any of the backup data saved in the backup file 23 contains backup data to be saved in the auxiliary storage medium 40.

FIG. 15 is another schematic diagram which shows contents of the diagnosis-and-recovery-result log summing-up file 29. In this example, as for the files A1, A2, . . . of the folder A and the files B1, B2, . . . of the folder B a number of times and a frequency of recovery operations are stored.

Processing by the diagnosis-and-recovery-result log analysis unit 215, however, is performed once each time self-diagnosis by the diagnosis-and-recovery unit 212 is performed as many as the predetermined number of times (step S67). In the processing by the diagnosis-and-recovery-result log analysis unit 215, the user can make settings via the additional-condition setting unit 214 to change settings of the analysis-condition file 30, thus re-setting a backup region which reflects the user's intention.

Figure 16:
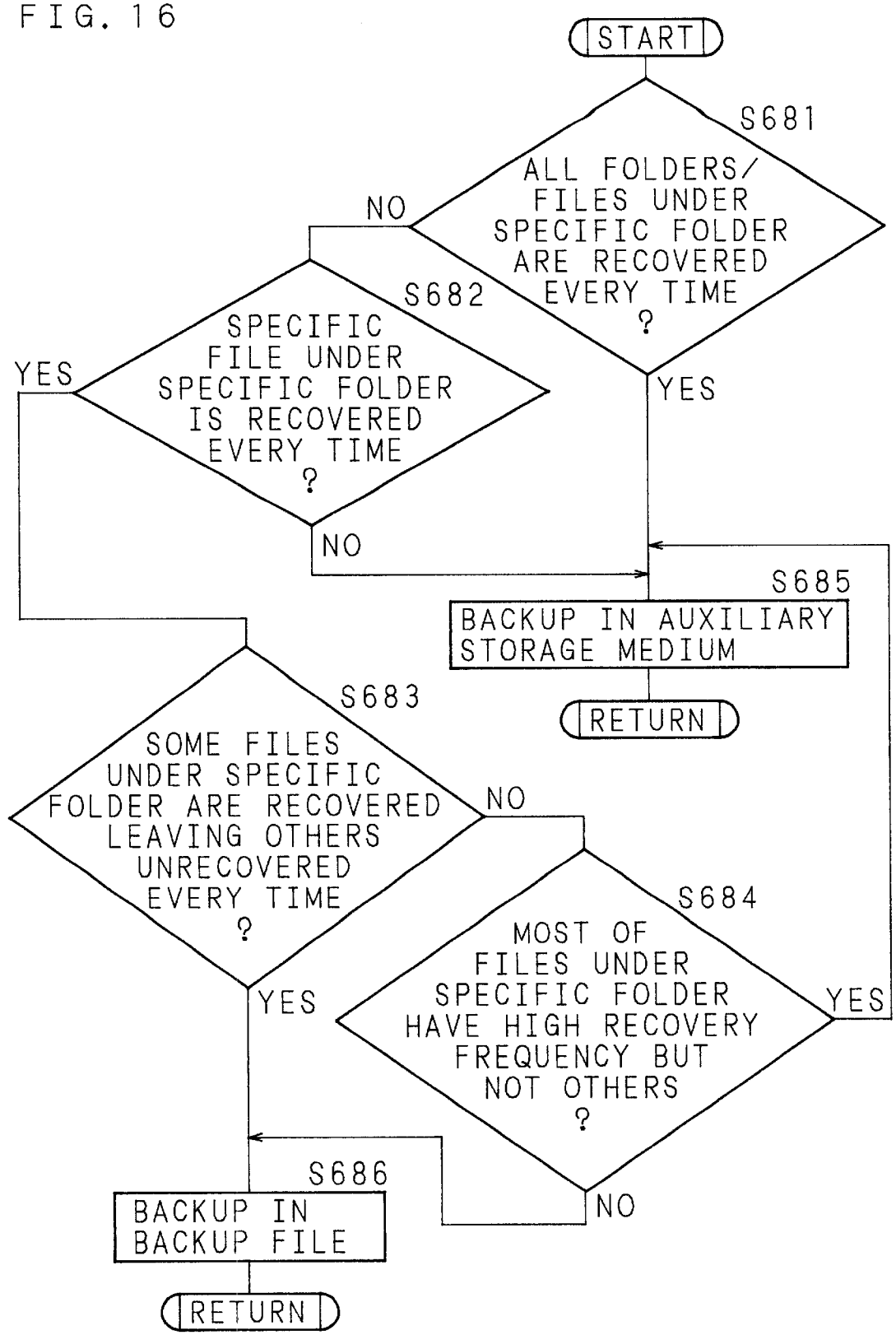
FIG. 16 is a flowchart showing a self-maintenance processing procedure of the computer according to the present invention.

The following will describe the above-mentioned re-setting of backup region by the diagnosis-and-recovery-result log analysis unit 215, with reference to a flowchart of FIG. 16 which shows the detailed processing contents.

In a first case where none of folders/files under the control of a specific folder has been recovered each time self-diagnosis is performed ("YES" at step S681), the specific folder is set so as to be backed up in the auxiliary storage medium 40 (step S685). Since such a folder need not undergo recovery usually in self-diagnosis, it may be backed up in the auxiliary storage medium 40.

In a second case where a specific file under the control of a specific folder has not been recovered each time self-diagnosis is performed ("NO" at step S682), the specific file is set so as to be backed up in the auxiliary storage medium (step S685). A specific example of this case may include an OS system file (e.g., device driver etc.) and an application executing file. These files are only read in temporarily when the computer is operated and so need not be recovered each time self-diagnosis is performed, so that it may be backed up in the auxiliary storage medium 40.

In a third case where some files under the control of a specific folder have been recovered each time self-diagnosis is performed but the remaining files are not recovered ("YES" at step S683), the specific folder is backed up in the backup file 23 (step S686). A fact that some of the files under the control of a specific folder are recovered every time self-diagnosis is performed means that recovery is required even in usual self-diagnosis, so that it is preferable to save backup data in the backup file 23.

In a fourth case where most of files under the control of a specific folder have not been recovered but some of them have been recovered from time to time ("YES" at step S684), the specific folder is basically backed up in the backup file 23, though leaving the final decision up to the user.

If none of the above-mentioned steps of S681, S682, S683, and S684 holds true ("NO" at step S684), the folder is backed up in the backup file 23.

Thus, a backup region is re-set by the diagnosis-and-recovery-result log analysis unit 215, so that if there is any data that its backup region has been changed in setting, from the backup file 23 to the auxiliary storage medium 40 ("YES" at step S69), information which specifies the data is stored in the analysis-result file 33 (step S70), according to the contents of which the backup-medium changing unit 217 compresses corresponding backup data stored in the backup file 23 and saves the backup data in the auxiliary storage medium 40, to change the backup region (step S71), thus finally updating contents of the backup region setting file 34 according to the changed settings of the above-mentioned backup region (step S72).

With this, the backup region for the backup data for such data that needs recovery in self-diagnosis to be performed next time must have been stored in the backup-region setting file 34, so that in the next self-diagnosis, according to the storage contents of the backup-region setting file 34, backup data of such data that needs recovery is read out of the backup file 23 or the auxiliary storage medium 40 and then uncompressed and the data is recovered.

If, for example, the folder B of the folders stored in the diagnosis-and-recovery-result log summing-up file 29 shown in the schematic diagram of FIG. 15 corresponds to the above-mentioned second case, "1" which corresponds to the folder B of the backup-region setting file 34 shown in the schematic diagram of FIG. 13 is rewritten with "0" to change the backup region from the backup file 23 to the auxiliary storage medium 40. Then, the computer 2 enters an actual operational state (step S73). Note here that if self-maintenance is not performed as many as the predetermined number of times at step S67, the computer 2 immediately enters an operational state.

Note here that although the present invention has been applied to a stand-alone-type computer in the above-mentioned embodiment, any computer can be used instead as far as it is connected to a network when the above-mentioned processing is performed by itself.

Figure 17:
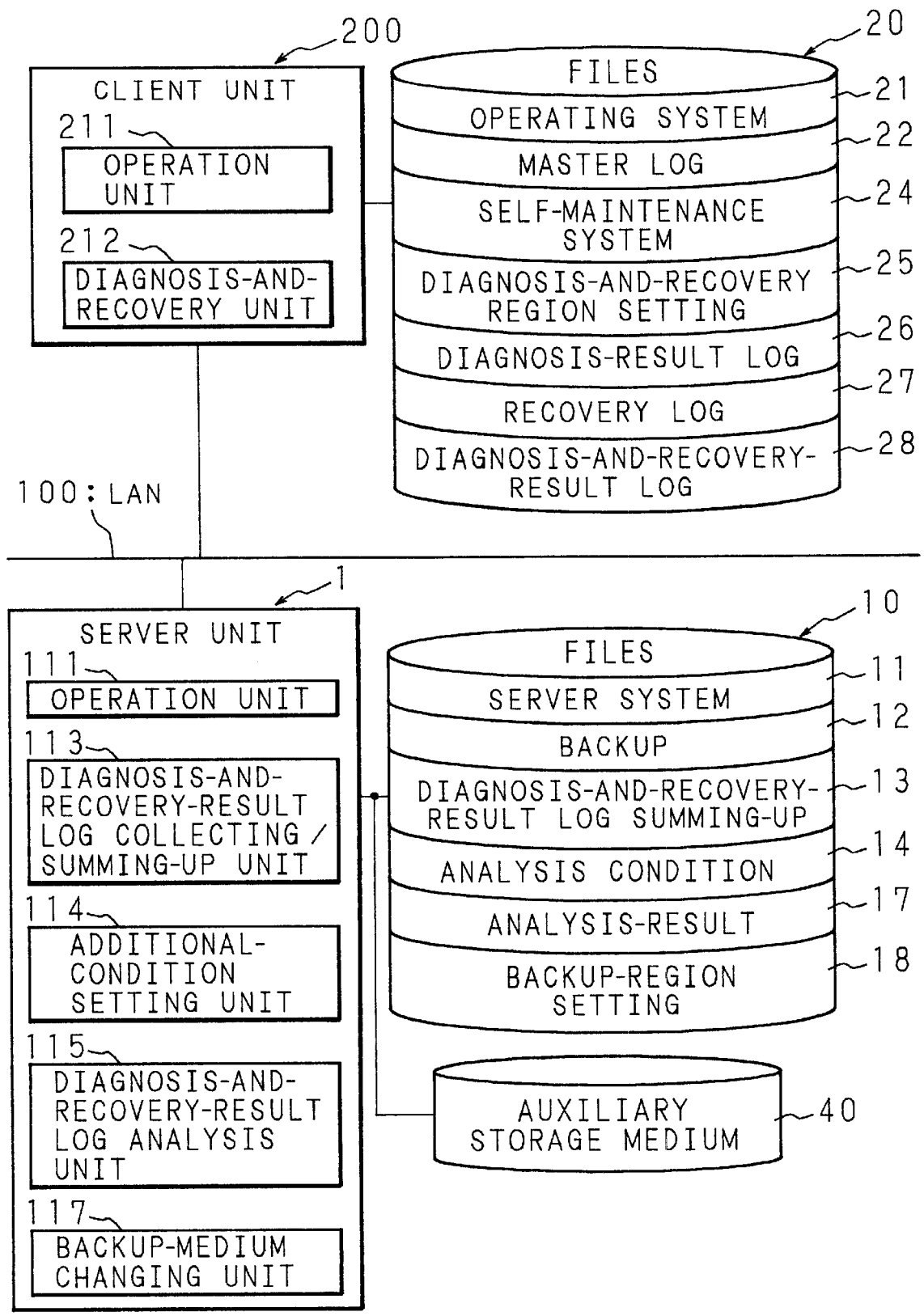
FIG. 17 is a block diagram showing further another configuration example of the computer network system according to the present invention.

Although in the above-mentioned embodiment the present invention has been applied to a stand-alone-type computer, the present invention may of course be applied to such a system that a plurality of computers is connected to a network, for example, such a computer network system as a client/server system. FIG. 17 is a block diagram which shows a configuration example of such a computer network system related to the present invention. Note here that this embodiment represents a client/server system as one example of the computer network system of the present invention.

In FIG. 17, a reference numeral 1 indicates a server unit as a server computer and a reference numeral 200 indicates a client unit as a client computer, both of which are connected to the LAN 100. Note here that although the server unit 1 and the client unit 200 are both shows one each in FIG. 17, they each can be given two or more and interconnected via the LAN 100.

The server unit 1 is a general-purpose computer, which comprises as hardware a CPU, a memory, a disk unit (hard disks, flexible disks, etc.), a printer, a display, a keyboard, a mouse and the like, and to which is connected a mass-capacity storage medium 10 which utilizes such hardware as a magnetic tape. The storage medium 10 installs therein the OS (Operating System) and a variety of software products. Further, to the server unit 1 is connected a mass-capacity auxiliary storage medium 40 which utilizes such hardware as a magnetic tape, CD-R, MD, etc. to store compressed backup data. The auxiliary storage medium 40 stores therein, as compressed, backup data for each client unit 200 having a low recovery frequency, i.e. low use frequency and/or backup data of such data that need not be backed up.

The storage medium 10 of the server unit 1 not only stores therein a server system file 11 which stores files of the OS and a variety of application software products necessary for operations of the server unit 1 itself but also hold collectively the backup file 23, the diagnosis-and-recovery-result log summing-up file 29, the analysis-condition file 30, the analysis result file 33, and the backup-region setting file 34 as the backup file 12, the diagnosis-and-recovery-result log summing-up file 13, the analysis-condition file 14, the analysis-result file 17, and the backup-region setting file 18 respectively instead of the respective client unit 200.

Also, in the stand-alone-type computer 2 shown in FIG. 11, functions of the diagnosis-and-recovery-result log collecting/summing-up unit 213, the additional-condition setting unit 214, the diagnosis-and-recovery-result log analysis unit 215, and the backup-medium changing unit 217 which are provided to the computer 2 itself are given as functions of the server unit 1 in a client/server system in the forms of the diagnosis-and-recovery-result log collecting/summing-up unit 113, the additional-condition setting unit 114, the diagnosis-and-recovery-result log analysis unit 115, and the backup-medium changing unit 117 respectively.

Therefore, in the client/server system, the client unit 200 itself has only the operation unit 211 and the diagnosis-and-recovery unit 212, while the storage medium 20 of the client unit holds therein the operating system file 21, the master log file 22, the self-maintenance system file 24, the diagnosis-and-recovery-region setting file 25, the diagnosis-result log file 26, the recovery log file 27, and the diagnosis-and-recovery-result log file 28.

Figure 18:
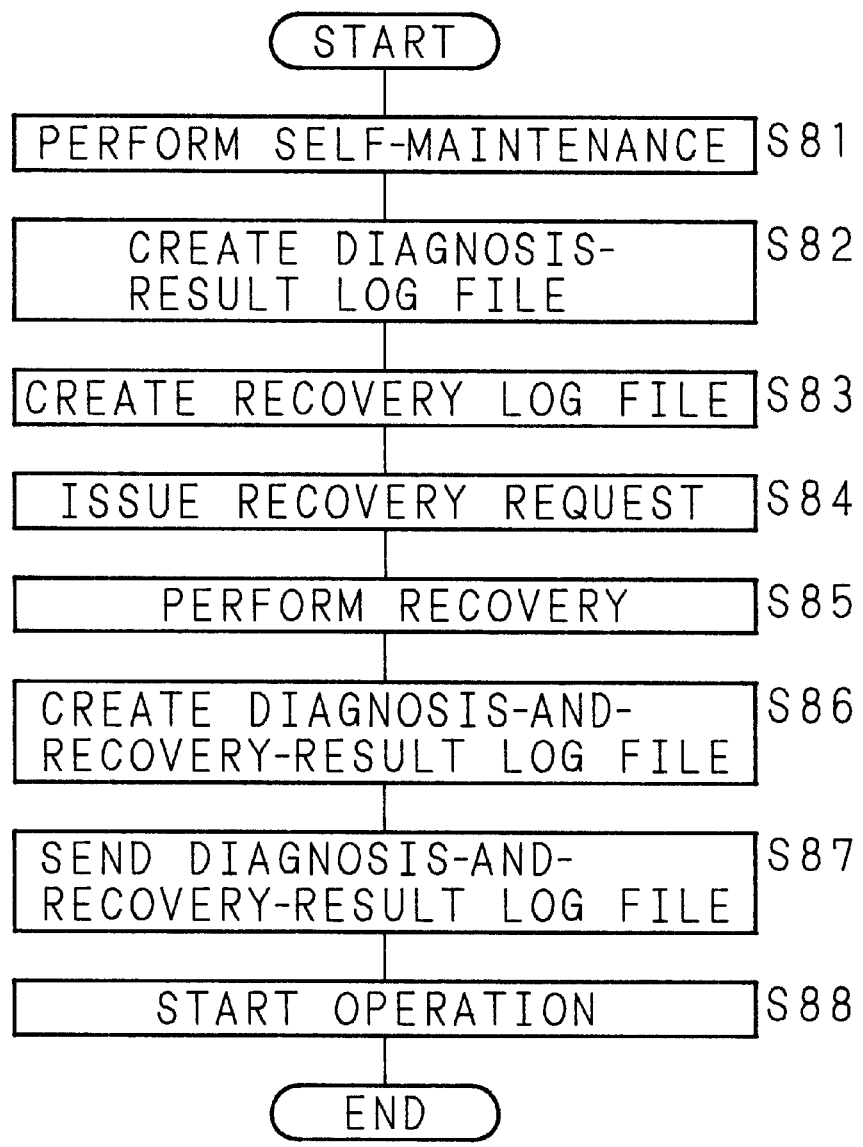
FIG. 18 is a flowchart showing another processing procedure performed at a client unit in the computer network system according to the present invention.
Figure 19:
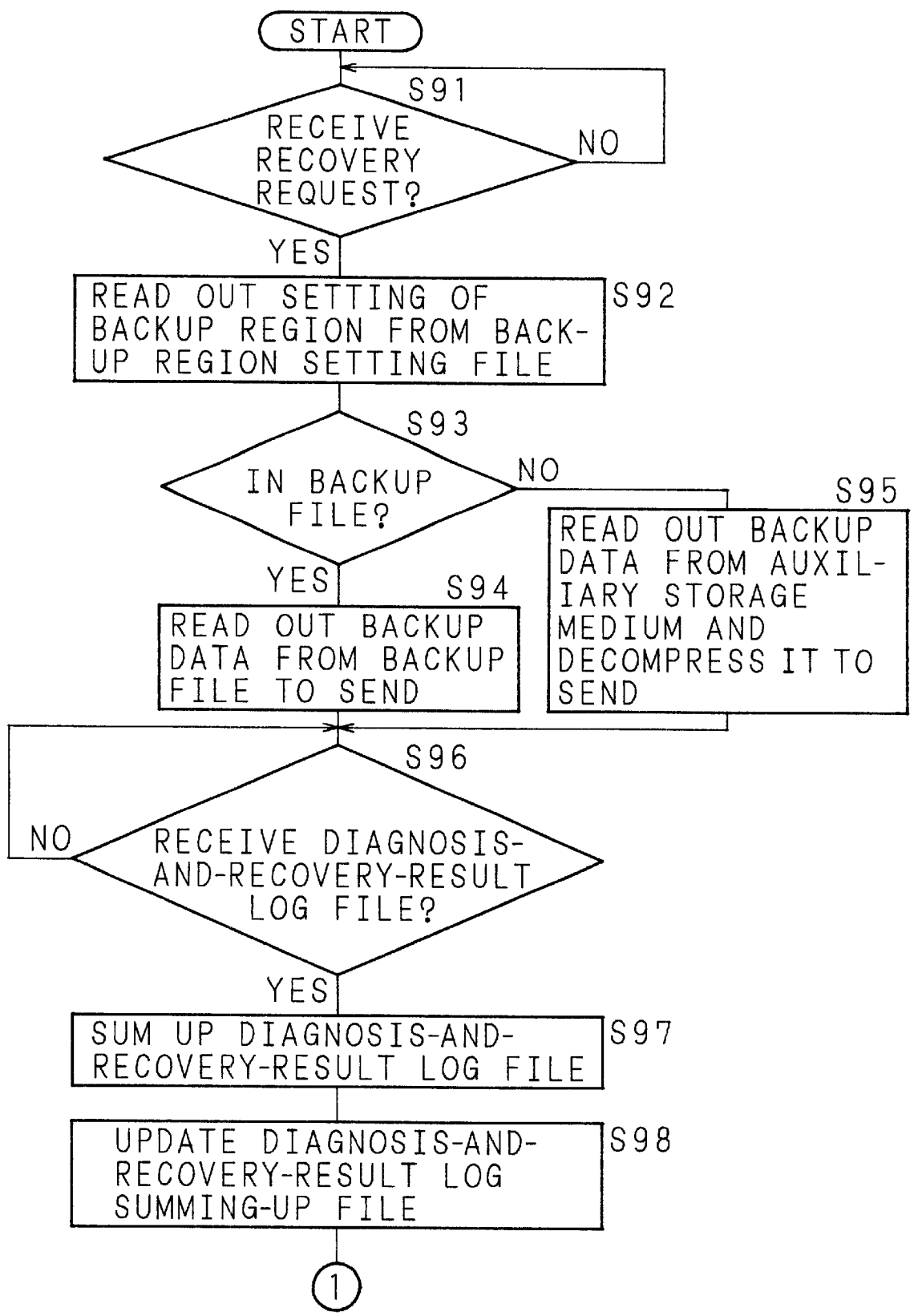
FIG. 19 is a flowchart showing another processing procedure performed at a server unit in the computer network system according to the present invention.
Figure 20:
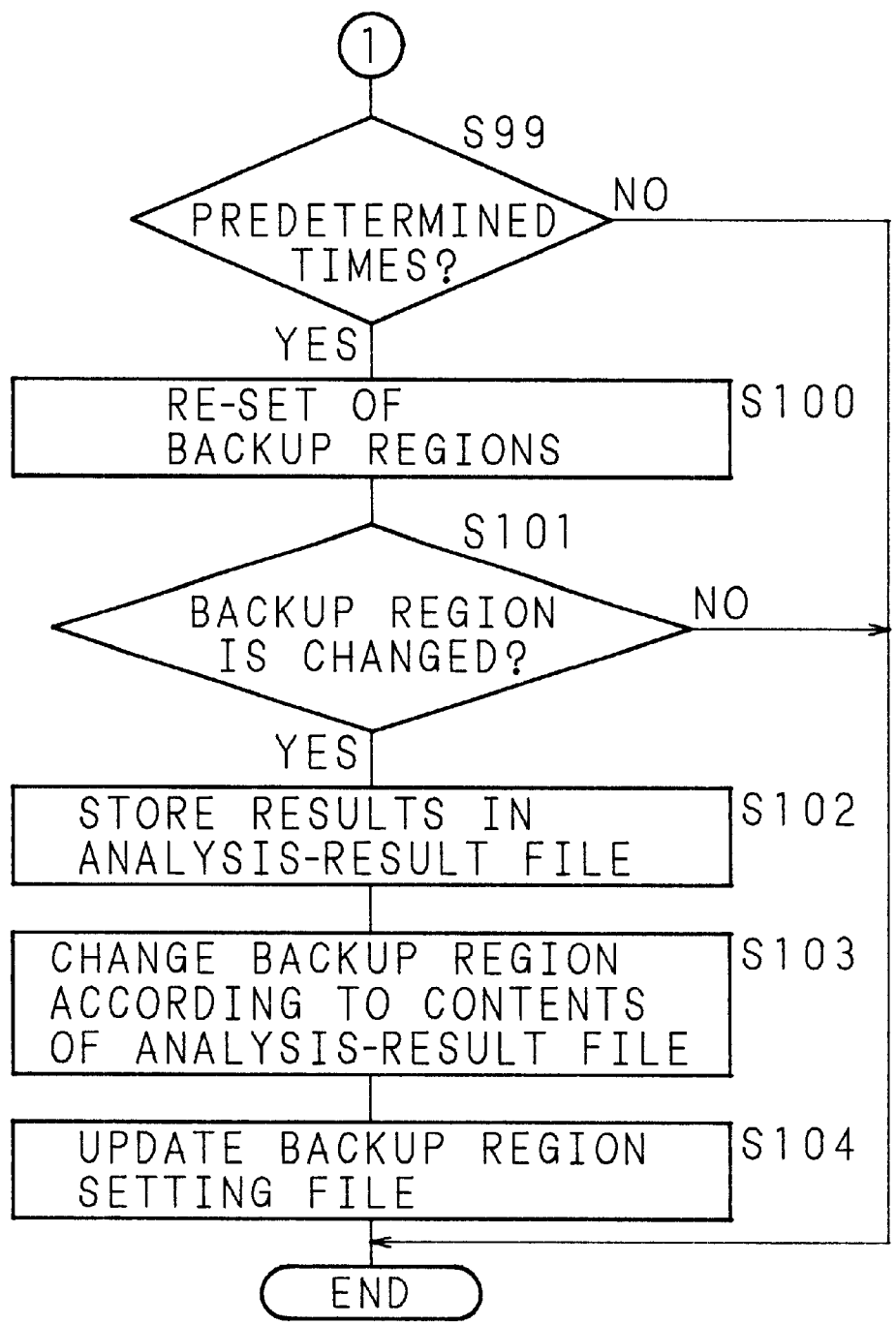
FIG. 20 is a flowchart showing another processing procedure performed at the server unit in the computer network system according to the present invention.

The following will describe a processing procedure in a case where the present invention is applied to a client/server system as one example of such a computer network system with reference to a flowchart which shows a processing procedure performed by the client unit 200 in a computer network system related to the present invention shown in FIG. 18 and another flowchart which shows a processing procedure performed by the server unit 1 in a computer network system related to the present invention shown in FIGS. 19 and 20.

Each client unit 200 performs self-diagnosis for itself by use of the diagnosis-and-recovery unit 212 (step S81), to create a diagnosis-result log file 26 (step S82) and create a diagnosis-result log file 26 (step S82) and also create a recovery log file 27 (step S83), based on which the client unit 200 issues a recovery request to the server unit (step S84).

When it receives the recovery request thus issued by the client unit 200 ("YES" at step S91), the server unit 1 decides whether the requested backup date is backed up in the backup file 12 or in the auxiliary storage medium 40 based on the setting of the backup-region setting file 18 (step S92). If the requested backup data is backed up in the backup file 12 ("YES" at step S93), the server unit 1 reads out the backup data from the backup file 12 and sends it to the client unit 200 (step S94) and, if it is backed up in the auxiliary storage medium 40 ("NO" at step S93), the server unit 1 reads out the backup data from the auxiliary storage medium 40 and decompresses it and then sends it to each client unit 200 (step S95).

Then, the server unit 1 stays in a standby state until it receives a diagnosis-and-recovery-result log file from the client unit 200 (step S96).

The client unit 200 receives the backup data sent from the server unit 1 and performs recovery (step S85), to create a diagnosis-and-recovery-result log file 28 (step S86). The diagnosis-and-recovery-result log file 28 is sent to the server unit 1 (step S87). Then, the client unit 200 enters an operation-start state.

At the server unit 1, the diagnosis-and-recovery-result log files 28 sent from each client unit 200 are summed up by the diagnosis-and-recovery-result log collecting/summing-up unit 113 (step S97) to update the diagnosis-and-recovery-result log summing-up file 13 (step S98), so that if such processing has not been performed as many as the predetermined number of times, i.e. self-maintenance for the client/server system has not been performed as many as the predetermined number of times ("NO" at step S99), the process is terminated.

When, on the other hand, self-maintenance has been performed as many as the predetermined number of times at step S99 ("YES" at step S99), the server unit 1 performs analysis by means of the diagnosis-and-recovery-result log analysis unit 115 for each client unit 200 to re-set backup regions for backup data (step S100). If there is such data present that its backup region has been changed from the backup file 12 to the auxiliary storage medium 40 ("YES" at step S101), information which specifies the data is stored in the analysis-result file 17 (step S102), based on the contents of which the backup-medium changing unit 117 reads out the corresponding backup data stored in the backup file 12 and compresses it and saves it in the auxiliary storage medium 40, to thus change the backup region (step S103), thus finally updating contents of the backup-region setting file 18 according to changes in setting of the above-mentioned backup region (step S104).

With this, the backup-region setting file 18 must have stored therein the backup region of backup data for each client unit 200, subsequently, according to the storage contents of the backup-region setting file 18, backup data of the data which needs recovery requested by each client unit 200 is read out from the backup file 12 or the auxiliary storage medium 40 and then decompressed and sent to the client unit 200.

Figure 21:
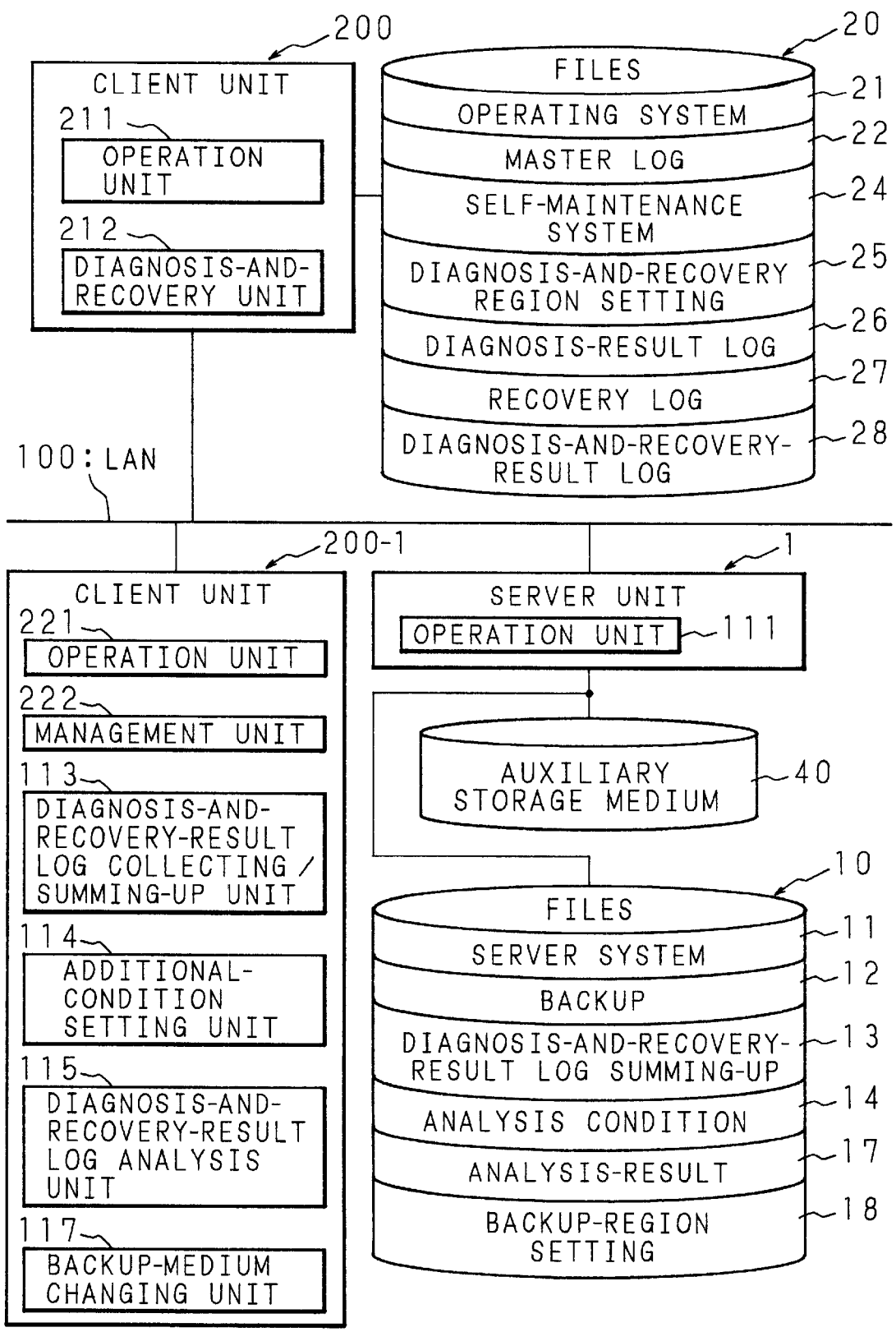
FIG. 21 is a block diagram showing further another configuration example of the computer network system according to the present invention.

FIG. 21 is a block diagram which shows further another configuration example of the computer network system according to the present invention. In this example, functions of the diagnosis-and-recovery-result log collecting/summing-up unit 113, the additional-condition setting unit 114, the diagnosis-and-recovery-result log analysis unit 115, and the backup-medium changing unit 117 provided to the server unit 1 shown in FIG. 17 are given to, for example, a client unit 200-1, different from the client unit 200 subject to diagnosis, for managing the system used for management by a manager. Note here that the backup file 12, the diagnosis-and-recovery-result log summing-up file 13, the analysis-condition file 14, the analysis-result file 17, and the backup-region setting file 18 are saved in the storage medium 10 of the server unit 1. The server unit 1 is provided with the auxiliary storage medium 40 as in the example shown in FIG. 17. Also note that the client unit 200-1 for system management is provided with a management unit 221 for managing the client unit 200-1 itself and another management unit 222 for managing the system.

In such a computer network system shown in FIG. 21, backup data for each client unit 200 is saved beforehand in the backup file 12 of the mass-capacity storage medium 10 or the auxiliary storage medium 40 of the server unit 1, to make it easy for the manager to make various settings via the client unit 200-1.

Note here that not only the above-mentioned configuration shown in FIG. 21, but other configuration may be applicable where each function provided to the client unit 200-1 and each file saved in the storage medium 10 of the server unit 1 is distributed over a plurality of computers including the client unit 200 which is subject to diagnosis and the sever unit 1 connected to the LAN 100 as a network.

Although, in the above-mentioned embodiment, each time the computer performs self-maintenance as many as the predetermined number of times or each time each client unit in the client/server system performs self-maintenance as many as the predetermined number of times, backup regions for backup data are re-set for each client unit 200, not to speak of a case where the user gave a predetermined instruction, self-maintenance may of course be performed for each predetermined lapse of time (e.g., one day, one week, etc.).

Note here that the above-mentioned stand-alone-type computer 2 and the client/server system's server unit 1 and the client unit 200-1 according to the present invention can be realized by permitting a general-purpose computer such as a personal computer, for example, to read in and install therein a software program recorded in a storage medium.

Figure 22:
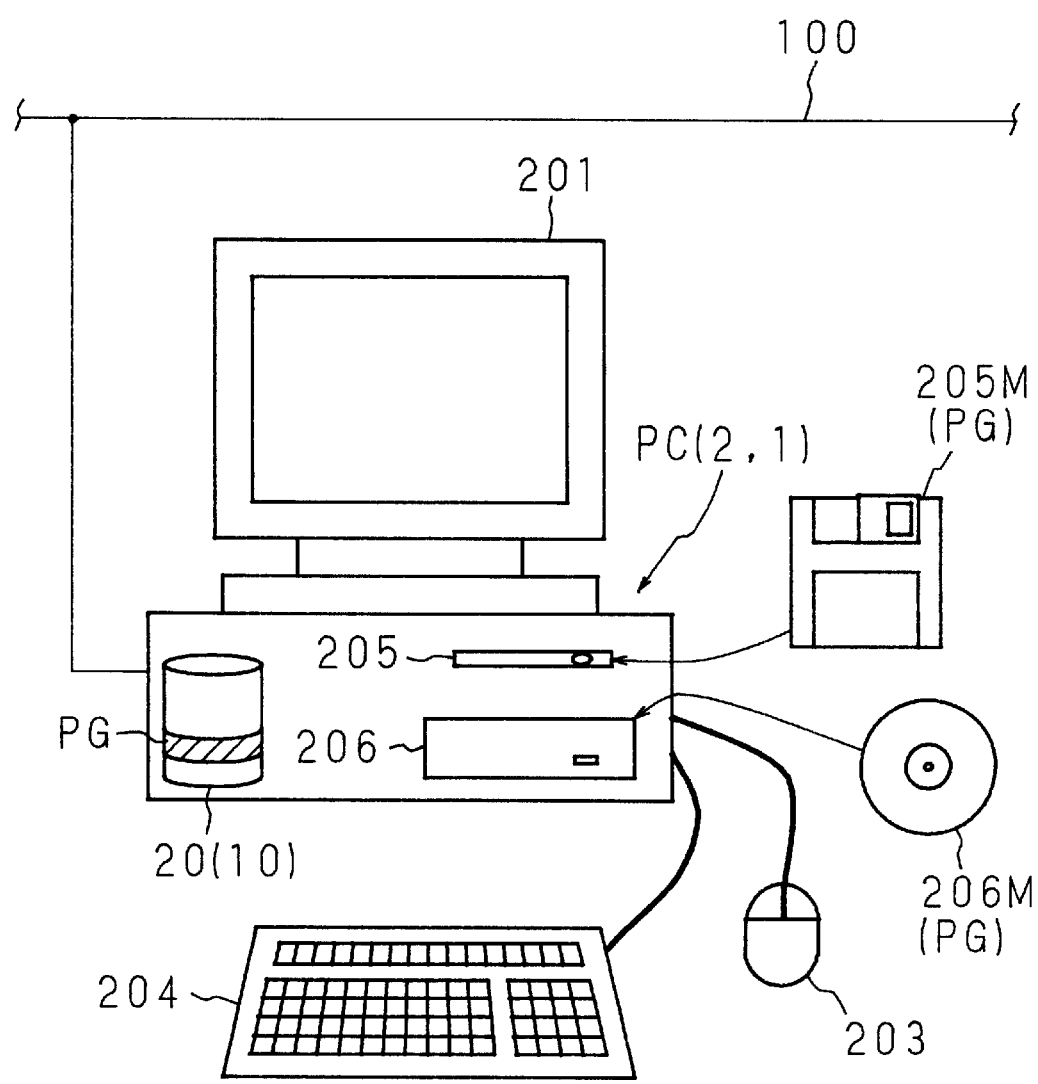
FIG. 22 is a schematic illustration showing a configuration of a personal computer used as a computer according to the present invention.

FIG. 22 is a schematic illustration of a personal computer PC used as a computer. The personal computer PC comprises a flexible-disk drive 205 for reading recorded contents (program codes) of a flexible disk 205M which records therein a program PG which causes the personal computer PC to function as the above-mentioned computer 2 or the server unit 1 in the client/server system according to the present invention and/or a CD-ROM drive 206 for reading recorded contents (program codes) of a CD-ROM206M which records therein the above-mentioned processing program PG.

A reference numeral 201 indicates a display such as a CRT display, a reference numeral 203 indicates a pointing device such as a mouse, and a reference numeral 204 indicates an input device such as a keyboard. Codes of the program PG read out from the flexible disk 205M by the flexible-disk drive 205 or codes of the program PG read out from the CD-ROM206M by the CD-ROM driver 206 are installed in a storage medium 20 (10) which utilizes hard disks, for example, to function as the above-mentioned various functional units.

Note here that although a flexible disk and/or a CD-ROM are shown as the storage medium, an appropriate drive (reading medium) can be combined to utilize a magnetic tape, an magneto-optical disk, etc.

A reference numeral 100 indicates a LAN, which connects the above-mentioned personal computer to other computers (server units) or the managing center. Therefore, via the LAN 100, the processing program PG can be installed from other computers or the managing center.

FIG. 23 is a schematic diagram which shows contents of the program PG, i.e. program codes for realizing functions of the computer 2 according to the present invention which are recorded in the flexible disk 205M given as one example of the recording medium.

The flexible disk 205M shown in FIG. 23 is a computer-readable recording medium which records therein a computer program which causes the computer 2 to store beforehand a diagnosis-and-recovery-region setting file 25 which specifies data to be subject to diagnosis and recovery, to recover the data stored as subject to diagnosis and recovery in the diagnosis-and-recovery-region setting file 25 with backup data, among the data diagnosed to need recovery based on results of self-diagnosis.

The computer program specifically includes contents of: a program code PC11 for causing the computer 2 to store a diagnosis-and-recovery-result log file 28 which specifies recovered data each time self-diagnosis is performed a program code PC12 for causing the computer 2 to classify contents of the diagnosis-and-recovery-result log file 28 into information which specifies each data piece and sum it up each time self-diagnosis is performed; a program code PC13 for causing the computer 2 to store a diagnosis-and-recovery-result log summing-up file 29 obtained by summing up the diagnosis-and-recovery-result log file 28; a program code PC14 for causing the computer 2 to analyze the diagnosis-and-recovery-result log summing-up file 29 according to an analysis-condition file 30, to decide whether each data piece should be subject to diagnosis and recovery; and a program code PC15 for causing the computer 2 to change settings of the diagnosis-and-recovery-region setting file 25 according to results of analyzing classification results of the diagnosis-and-recovery-result log summing-up file 29.

By reading in the program PG recorded in the flexible disk 205M given as such a recording medium, the computer 2 can function as the above-mentioned computer 2 according to the present invention.

FIG. 24 is another schematic diagram showing the contents of the program PG for realizing the functions of the server unit 1 or the client unit 200-1 in a client/server system according to the present invention recorded in the flexible disk 205M given as one example of a recording medium.

The flexible disk 205M shown in FIG. 24 is a computer-readable recording medium which records therein a computer program for causing the server unit 1 connected to each client unit 200 to set a diagnosis-and-recovery-region setting file 25 by storing the diagnosis-and-recovery-region setting file 25 which specifies data subject to diagnosis and recovery. The client unit 200 recovers the data, stored as subject to diagnosis and recovery in the diagnosis-and-recovery-region setting file 25 with backup data, among the data diagnosed to need recovery based on results of self-diagnosis.

The computer program specifically includes contents of: a program code PC21 for causing the server unit 1 (or client nit 200-1) to classify contents of the diagnosis-and-recovery-result log file 28 into information which specifies each data piece and sum it up each time the client unit 200 performs self-diagnosis; a program code PC22 for causing the server unit 1 (or client unit 200-1) to store the diagnosis-and-recovery-result log summing-up file 13 obtained by summing up the diagnosis-and-recovery-result log file 28 for each client unit 200; a program code PC23 for causing the server unit 1 (or client unit 200-1) to analyze the diagnosis-and-recovery-result log summing-up file 13 according to the analysis-condition file 14, to decide whether each data piece should be subject to diagnosis and recovery for each client unit 200; and a program code PC24 for causing the server unit 1 (or client unit 200-1) to change settings of the diagnosis-and-recovery-region setting file 25 of the client unit 200 according to results of analysis of the diagnosis-and-recovery-result log summing-up file 13.

By reading in the program PG recorded in the flexible disk 205M given as one example of such a recording medium, the server unit 1 or the client unit 200-1 can function as the above-mentioned server unit 1 or the client unit 200-1 lap according to the present invention respectively.

FIG. 25 is further another schematic diagram showing contents of the program PG, i.e. the program codes for realizing the functions of the computer 2 according to the present invention which is recorded in the flexible disk 205M given as one example of a recording medium.

The flexible disk 205M shown in FIG. 25 is a computer-readable recording medium which records therein a computer program causing the computer 2 (or client unit 200-1) to replace data diagnosed to need recovery based on results of self-diagnosis performed on data which itself uses with backup data read out from the backup file 23 or the auxiliary storage medium 40, thus recovering the data.

The computer program specifically includes contents of: a program code PC11 for causing the computer to store information which specifies recovered data in the diagnosis-and-recovery-result log file 28 each time self-diagnosis is performed; a program code PC12 for causing the computer to classify information stored in the diagnosis-and-recovery-result log file 28 and sum it up each time self-diagnosis is performed; a program code PC13 for causing the computer to store summing-up results in the diagnosis-and-recovery-result log summing-up file 29 (or 13); a program code PC14 for causing the computer to analyze the summing-up results stored in the diagnosis-and-recovery-result log summing-up file 29 (or 13) according to analysis conditions stored in the analysis-condition file 30 (or 14), to decide which one of the backup file 23 and the auxiliary storage medium 40 the backup data for each data piece should be stored in; and a program code PC15 for causing the computer to change the backup region for backup data from the backup file 23 to the auxiliary storage medium 40 according to the analysis results. The computer program includes also a program code P16 for causing the computer to compress data when changing the backup region for backup data from the backup file 23 to the auxiliary storage medium 40.

By reading in the program PG recorded in the flexible disk 205M given as one example of such a recording medium, the computer 2 can function as the above-mentioned computer 2 according to the present invention. Also, by reading in at least one of a plurality of program codes of the program PG recorded in the flexible disk 205M given as one example of such a recording medium, the server unit 1 or the client unit 200 or 200-1 can function as the above-mentioned server unit 1 or the client unit 200 or 200-1 according to the present invention respectively.

As this invention may be embodied in several forms without departing from the spirit of essential characteristics thereof, the present embodiment if therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A computer comprising:
a backup-data storage unit for storing backup data for data usable by the computer itself;
a diagnosis-and-recovery-object settings storage unit where information to specify data to be subject to diagnosis and recovery among the data usable by the computer itself is set;
a diagnosis-and-recovery unit for replacing with data saved in the backup-data storage unit such data specified by the information set in the diagnosis-and-recovery-object settings storage unit, among data diagnosed to need recovery based on results of self-diagnosis performed on data usable by the computer itself, thus recovering the data;
a diagnosis-and-recovery-result storage unit for storing information which specifies recovered data each time the diagnosis-and-recovery unit performs self-diagnosis;
a diagnosis-and-recovery-result summing-up unit for classifying storage contents of the diagnosis-and-recovery-result storage unit into information which specifies each data piece, and sum up the classified information each time the diagnosis-and-recovery unit performs self-diagnosis;
a diagnosis-and-recovery-result summing-up storage unit for storing summing-up results by the diagnosis-and-recovery-result summing-up unit;
an analysis-condition storage unit for storing conditions for analyzing the storage contents of the diagnosis-and-recovery-result summing-up storage unit;
a diagnosis-and-recovery-result analysis unit for analyzing the storage contents of the diagnosis-and-recovery-result summing-up storage unit according to the storage contents of the analysis-condition storage unit, to decide whether each data piece should be subject to diagnosis and recovery; and
a new-diagnosis-and-recovery-object setting unit for changing settings of the diagnosis-and-recovery-object settings storage unit according to the analysis results by the diagnosis-and-recovery-result analysis unit.

2. The computer according to claim 1, wherein said conditions stored in the analysis-condition storage unit include a frequency and the number of times of performing recovery for each data piece.

3. A computer network system wherein a first computer and a second computer which stores therein backup data of data usable by the first computer are connected to a network, one of said computers connected to the network comprising:
a diagnosis-and-recovery-object settings storage unit where information to specify data to be subject to diagnosis and recovery among the data usable by the first computer;
a diagnosis-and-recovery unit for replacing with data saved by the second computer such data specified by the information set in the diagnosis-and-recovery-object settings storage unit among data diagnosed to need recovery based on results of diagnosis performed on data usable by the first computer, thus recovering the data;
a diagnosis-and-recovery-result storage unit for storing information which specifies recovered data each time the diagnosis-and-recovery unit diagnoses the first computer;

a diagnosis-and-recovery-result collecting/summing-up unit for collecting the storage contents of the diagnosis-and-recovery-result storage unit to classify the collected contents into information which specifies each data piece and sum up the classified information, each time the diagnosis-and-recovery unit diagnoses the first computer;

a diagnosis-and-recovery-result summing-up storage unit for storing summing-up results by the diagnosis-and-recovery-result collecting/summing-up unit;

an analysis-condition storage unit for storing conditions for analyzing the storage contents of the diagnosis-and-recovery-result summing-up storage unit;

a diagnosis-and-recovery-result analysis unit for analyzing the storage contents of the diagnosis-and-recovery-result summing-up storage unit according to the storage contents of the analysis-condition storage unit, to decide whether each data piece should be subject to diagnosis and recovery; and a diagnosis-and-recovery-object settings changing unit for changing settings of the diagnosis-and-recovery-object settings storage unit according to the analysis results by the diagnosis-and-recovery-result analysis unit.

4. The computer according to claim 3, wherein said conditions stored in the analysis-condition storage unit include a frequency and the number of times of recovering each data piece related to the first computer.

5. A computer connected via a network to such a computer that comprises a diagnosis-and-recovery-object settings storage unit for storing information which specifies data to be subject to diagnosis and recovery among data usable by a computer subject to diagnosis, a diagnosis-and-recovery unit for replacing with backup data such data specified by the information set in the diagnosis-and-recovery-object settings storage unit, among data diagnosed to need recovery based on results of diagnosing data usable by the computer subject to diagnosis, thus recovering the data, and a diagnosis-and-recovery-result storage unit for storing information which specifies recovered data each time the diagnosis-and- recovery unit performs diagnosis, said former computer further comprising:

a diagnosis-and-recovery-result collecting/summing-up unit for collecting the storage contents of the diagnosis-and-recovery-result storage unit to classify the collected contents into information which specifies each data piece and sum up the classified information, each time the diagnosis-and-recovery unit diagnoses the computer subject to diagnosis and recovery;

a diagnosis-and-recovery-result summing-up storage unit for storing summing-up results by the diagnosis-and-recovery-result collecting/summing-up unit;

an analysis-condition storage unit for storing conditions for analyzing the storage contents of the diagnosis-and-recovery-result summing-up storage unit;

a diagnosis-and-recovery-result analysis unit for analyzing storage contents of the diagnosis-and-recovery-result summing-up storage unit according to the storage contents of the analysis-condition storage unit, to decide whether each data piece should be subject to diagnosis and recovery; and a diagnosis-and-recovery-object settings changing unit for changing settings of the diagnosis-and-recovery-object settings storage unit according to the analysis results by the diagnosis-and-recovery-result analysis unit.

6. The computer according to claim 5, wherein said conditions stored in the analysis-condition storage unit include a frequency and the number of times of recovering each data piece related to the computer to be diagnosed.

7. A computer-readable recording medium which records therein a computer program for causing a computer to store beforehand diagnosis-and-recovery-object setting information which is information to specify data to be subject to diagnosis and recovery among data usable by the computer, to replace with backup data such data specified by the information set as the diagnosis-and-recovery-object setting information, among data diagnosed to need recovery based on results of self-diagnosis performed on the data usable by the computer, thus recovering the data, said computer program including:

program code means for causing the computer to store diagnosis-and-recovery-result information which specifies recovered data, each time self-diagnosis is performed;

program code means for causing the computer to classify the contents of the diagnosis-and-recovery-result information into information which specifies each data piece and to sum up the classified data, each time self-dignosis is performed;

program code means for causing the computer to store diagnosis-and-recovery-result summing-up information obtained by summing up the diagnosis-and-recovery-result information;

program code means for causing the computer to analyze the diagnosis-and-recovery-result summing-up information according to predetermined analysis-condition information, to decide whether each data piece should be subject to diagnosis and recovery; and program code means for causing the computer to change settings of the diagnosis-and-recovery-object setting information according to the analysis results of the diagnosis-and-recovery-result summing-up information.

8. The recording medium according to claim 7, wherein the analysis-condition information includes a frequency and the number of times of recovering each data piece.

9. A computer-readable recording medium for stored therein a computer program for causing a computer connected to a computer subject to diagnosis to store beforehand diagnosis-and-recovery-object setting information which is information to specify data to be subject to diagnosis and recovery among data usable by the computer itself, to replace with backup data such data specified by the information set as the diagnosis-and-recovery-object setting information, among data diagnosed to need recovery based on results of self-diagnosis performed on the data usable by the computer itself, thus recovering the data, said computer program including:

program code means for causing the computer to classify contents of diagnosis-and-recovery-result information of the computer subject to diagnosis into information which specifies each data piece and sum up the classified information, each time the diagnosis-object computer performs self-diagnosis;

program code means for causing the computer to store diagnosis-and-recovery-result summing-up information obtained by summing up the diagnosis-and-recovery-result information for each computer subject to diagnosis;

program code means for causing the computer to analyze the diagnosis-and-recovery-result summing-up information according to predetermined analysis-condition information, to decide whether each data piece should be subject to diagnosis and recovery for each computer subject to diagnosis; and program code means for causing the computer to change settings of diagnosis-and-recovery-object setting information of the diagnosis-object computer, according to the analysis results of the diagnosis-and-recovery-result summing-up information.

10. The recording medium according to claim 9, wherein the analysis-condition information includes a frequency and the number of times of recovering each data piece related to each diagnosis-object computer.

11. A computer which comprises a diagnosis-and-recovery unit for replacing with backup data such data diagnosed to need recovery based on results of self-diagnosis performed on data usable by the computer itself, thus recovering the data, a plurality of storage media for storing backup data;

a diagnosis-and-recovery-result storage unit for storing information which specifies recovered data, each time the diagnosis-and-recovery unit performs self-diagnosis;

a diagnosis-and-recovery-result summing-up unit for classifying the storage contents of the diagnosis-and-recovery-result storage unit into information which specifies each data piece and sum up the classified information, each time the diagnosis-and-recovery unit performs self-diagnosis;

a diagnosis-and-recovery-result summing-up storage unit for storing the summing-up results by the diagnosis-and-recovery-result summing-up unit;

an analysis-condition the storage unit for storing conditions for analyzing storage contents of the diagnosis-and-recovery-result summing-up storage unit;

a diagnosis-and-recovery-result analysis unit for analyzing the storage contents of the diagnosis-and-recovery-result summing-up storage unit according to the storage contents of the analysis-condition storage unit, to decide in which one of the plurality of storage media such backup data for each data piece should be stored; and a backup-medium changing unit for changing a backup-data storage medium among the plurality of storage media according to the analysis results of the diagnosis-and-recovery-result analysis unit.

12. The computer according to claim 11, wherein the plurality of storage media take mutually different read-out times for reading out data stored therein and the backup-medium changing unit-compresses data before storing the data in such a storage medium that takes a relatively long read-out time.

13. The computer according to claim 11, wherein the conditions stored in the analysis-condition storage unit include a frequency and the number of times of recovering each data piece.

14. A computer network system to which a plurality of computers including a computer subject to diagnosis are connected provided with a diagnosis-and-recovery unit for replacing with backup data such data diagnosed to need recovery based on results of self-diagnosis performed on data usable by the computer subject to diagnosis itself, thus recovering the data, wherein at least two of said computers including the computer subject to diagnosis comprising at least one of:

at least one of a plurality of storage media for storing backup data of data usable by the computer subject to diagnosis;

a diagnosis-and-recovery-result storage unit for storing information which specifies recovered data, each time the diagnosis-and-recovery unit performs self-diagnosis;

a diagnosis-and-recovery-result summing-up unit for classifying the storage contents of the diagnosis-and-recovery-result storage unit into information which specifies each data piece and summing up the classified information, each time the diagnosis-and-recovery unit performs self-diagnosis;

a diagnosis-and-recovery-result summing-up storage unit for storing the summing-up results by the diagnosis-and-recovery-result summing-up unit;

an analysis-condition storage unit for storing conditions for analyzing the storage contents of the diagnosis-and-recovery-result summing-up storage unit;

a diagnosis-and-recovery-result analysis unit for analyzing the storage contents of the diagnosis-and-recovery-result summing-up storage unit according to the storage contents of the analysis-condition storage unit, to decide in which one of the plurality of storage media such backup data for each data piece should be stored; and a backup-medium changing unit for changing backup-data-storage medium among the plurality of storage media according to the analysis results of the diagnosis-and-recovery-result analysis unit.

15. The computer network system according to claim 14, wherein the plurality of storage media take mutually different read-out times for reading out data stored therein and the backup-data-medium changing unit compresses data before storing the data in a storage medium which takes a relatively larger read-out time.

16. The computer network system according to claim 14, wherein the conditions stored in the analysis-condition storage unit include a frequency and the number of times of recovering each data piece.

17. A computer connected to a computer subject to diagnosis provided with a diagnosis-and-recovery unit for replacing with backup data such data diagnosed to need recovery based on results of self-diagnosis performed on data usable by the computer subject to diagnosis itself, thus recovering the data, comprising:

at least one of a plurality of storage media for storing backup data of data usable by the computer subject to diagnosis;

a diagnosis-and-recovery-result storage unit for storing information which specifies recovered data, each time the diagnosis-and-recovery unit performs self-diagnosis;

a diagnosis-and-recovery-result summing-up unit for classifying the storage contents of the diagnosis-and-recovery-result storage unit, into information which specifies each data piece and summing up the classified information, each time the diagnosis-and-recovery unit performs self-diagnosis;

a diagnosis-and-recovery-result summing-up storage unit for storing the summing-up results by the diagnosis-and-recovery-result summing-up unit;

an analysis-condition storage unit for storing conditions for analyzing the storage contents of the diagnosis-and-recovery-result summing-up storage unit;

a diagnosis-and-recovery-result analysis unit for analyzing the storage contents of the diagnosis-and-recovery-result summing-up storage unit according to the storage contents of the analysis-condition storage unit, to decide in which one of the plurality of storage media such backup data for each data piece should be stored; and a backup-data-medium changing unit for changing a backup-data-storage medium to store backup data therein among the plurality of storage media according to analysis results of the diagnosis-and-recovery-result analysis unit.

18. The computer according to claim 17, wherein the plurality of storage media take mutually different read-out times for reading out data recorded therein and the backup-data-medium changing unit compresses data before storing the data in a storage medium which takes a relatively long read-out time.

19. The computer according to claim 17, wherein the conditions stored in the analysis-condition storage unit include a frequency and the number of times of recovering each data piece.

20. A computer-readable recording medium which records therein a computer program for causing a computer to read out, from a plurality of storage media, backup data of such data diagnosed to need recovery based on results of self-diagnosis performed on data usable by the computer itself in order to replace the data with the read out backup data, thus recovering the data, said computer program comprising:

program code means for causing the computer to store information which specifies recovered data each time self-diagnosis is performed;

program code means for causing the computer to classify information which specifies the recovered data stored and to sum up the classified information, each time self-diagnosis is performed;

program code means for causing the computer to store the summing-up results;

program code means for causing the computer to analyze the summing-up results according to predetermined conditions, to decide in which one of the plurality of storage media such backup data for each data piece should be stored; and program code means for causing the computer to change a backup-data-storage medium among the plurality of storage media according to the analysis results.

21. The recording medium according to claim 20, further comprising a program code means for causing the computer to compress data before storing the data in a storage medium, which takes a relatively long read-out time, among the plurality of storage media.

22. The recording medium according to claim 20, wherein the conditions include a frequency and the number of times of recovering each data piece.

* * * * *

UNITED STATES PATENT AND TRADEMARK OFFICE
CERTIFICATE OF CORRECTION

PATENT NO.   : 6,546,500 B1
DATED        : April 8, 2003
INVENTOR(S)  : Takashi Miyamoto It is certified that error appears in the above-identified patent and that said Letters Patent is hereby corrected as shown below:

<u>Column 31,</u>
Line 49, delete "-".

Signed and Sealed this

First Day of July, 2003

JAMES E. ROGAN
*Director of the United States Patent and Trademark Office*